(12) United States Patent
Bahari et al.

(10) Patent No.: US 8,564,154 B2
(45) Date of Patent: Oct. 22, 2013

(54) WIND TURBINES WITH DIFFUSERS FOR THE BUILDINGS OR STRUCTURES

(75) Inventors: Habib Bahari, Rockville, MD (US); Saied Tadayon, Potomac, MD (US)

(73) Assignee: BT Patent LLC, Potomac, MD (US)

( * ) Notice: Subject to any disclaimer, the term of this patent is extended or adjusted under 35 U.S.C. 154(b) by 294 days.

(21) Appl. No.: 13/165,382

(22) Filed: Jun. 21, 2011

(65) Prior Publication Data

US 2011/0316279 A1      Dec. 29, 2011

Related U.S. Application Data

(60) Provisional application No. 61/358,388, filed on Jun. 24, 2010.

(51) Int. Cl.
*F03B 15/00* (2006.01)

(52) U.S. Cl.
USPC ............................................................. 290/55

(58) Field of Classification Search
USPC ............................................. 290/55, 44
See application file for complete search history.

(56) References Cited

U.S. PATENT DOCUMENTS

| | | | |
|---|---|---|---|
| 4,084,918 A * | 4/1978 | Pavlecka | 415/1 |
| 4,140,433 A | 2/1979 | Eckel | |
| 4,186,313 A | 1/1980 | Wurtz | |
| 4,375,035 A * | 2/1983 | Groeger | 290/55 |
| 4,516,907 A * | 5/1985 | Edwards | 415/4.5 |
| 4,609,827 A * | 9/1986 | Nepple | 290/44 |
| 5,977,649 A * | 11/1999 | Dahill | 290/55 |
| 6,043,565 A * | 3/2000 | Les Strange | 290/55 |
| 6,270,308 B1 | 8/2001 | Groppel | |
| 6,590,363 B2 * | 7/2003 | Teramoto | 320/101 |
| 6,638,005 B2 * | 10/2003 | Holter et al. | 415/4.2 |
| 6,674,181 B2 * | 1/2004 | Harbison | 290/55 |
| 6,981,839 B2 * | 1/2006 | Fan | 415/4.1 |
| 7,083,378 B2 | 8/2006 | Hur | |
| 7,098,553 B2 | 8/2006 | Wiegel et al. | |
| 7,218,011 B2 * | 5/2007 | Hiel et al. | 290/43 |

(Continued)

FOREIGN PATENT DOCUMENTS

SE      9901545 A   *   10/2000

OTHER PUBLICATIONS

Gerard Van Bussel, 2007 IOP Publishing Ltd, Journal of Physics Conf Series 75 (2007) 012010, "The science of making torque from wind", p. 1-12.

(Continued)

*Primary Examiner* — Joseph Waks
(74) *Attorney, Agent, or Firm* — Bijan Tadayon; Saied Tadayon

(57) ABSTRACT

One example of our system makes it easier to bring the wind turbines to the residential and densely populated areas. The systems can be cascaded together to supply a bigger population or area. Since most of the system is hidden, it looks better for appearance of the city/houses. It has less of noise problem near houses, and less bird and bat mortality rates, with less radar interferences, less maintenance worker hazard, and less shipping/installation cost. This technology addresses e.g. Energy and Power Management Systems for harvesting wind energy by wind-catcher tower and diffuser augmented wind turbines. For example, we discuss the placement of diffusers at the intake of the wind turbines, inside a wind-catcher tower, to significantly increase the efficiency of the wind energy capture, plus the modular design of the wind-catcher tower. Various designs for the system and components are presented here.

18 Claims, 25 Drawing Sheets

(56) References Cited

U.S. PATENT DOCUMENTS

| | | | |
|---|---|---|---|
| 7,230,348 B2* | 6/2007 | Poole | 290/55 |
| 7,242,108 B1* | 7/2007 | Dablo | 290/55 |
| 7,245,039 B2* | 7/2007 | DuHamel | 290/44 |
| 7,323,791 B2* | 1/2008 | Jonsson | 290/55 |
| 7,834,477 B2 | 11/2010 | Sheikhrezai | |
| 7,880,323 B2* | 2/2011 | Menges | 290/55 |
| 8,334,608 B2* | 12/2012 | Pechlivanoglou et al. | 290/44 |
| 8,368,240 B1* | 2/2013 | Burkett | 290/44 |
| 2007/0296216 A1 | 12/2007 | Liao | |
| 2008/0112789 A1* | 5/2008 | Kelaiditis | 415/4.1 |
| 2009/0045632 A1* | 2/2009 | Krauss | 290/54 |
| 2011/0316284 A1* | 12/2011 | Tabatabaian | 290/55 |

OTHER PUBLICATIONS

Li et al, Science Direct, Building and Environment, 42 (2007) 1135-1141, Elsevier Publishing, copyright 2006, "The assessment of the performance of a windcatcher system using computational fluid dynamics".

* cited by examiner

WIND TURBINES WITH DIFFUSERS FOR THE BUILDINGS OR STRUCTURES

RELATED APPLICATIONS

This application is related to (and incorporates by reference all the teaching of) a provisional application with the same title, inventors, and assignee, Ser. No. 61/358,388, filed Jun. 24, 2010, which is also a CIP of an earlier application, Ser. No. 12/455,042, by a common inventor, and having the same assignee.

BACKGROUND OF THE INVENTION

We need to harvest renewable energy sources, such as wind, for the sake of environment, and for less dependence on the foreign oil/energy. We need a system that can be installed in urban areas/cities, for more usage by people, and less transferring/transmission cost, to bring the electricity to densely populated areas/cities.

SUMMARY OF THE INVENTION

This invention makes it easier to bring the wind turbines to the residential and densely populated areas. The systems can be cascaded together to supply a bigger population or area. Since most of the system is hidden, it looks better for appearance of the city/houses. It has less of noise problem near houses, and less bird and bat mortality rates, with less radar interferences, less maintenance worker hazard, and less shipping/installation cost.

This technology addresses e.g. Energy and Power Management Systems for harvesting wind energy by wind-catcher tower and diffuser augmented wind turbines. For example, we discuss the placement of diffusers at the intake of the wind turbines, inside a wind-catcher tower, to significantly increase the efficiency of the wind energy capture, plus the modular design of the wind-catcher tower and diffusers augmented wind turbines, to allow incremental expansion of the generation facility and to lower its maintenance cost. Various wind-catcher towers with single or multi-diffuser augmented wind turbines mounted inside are used here. Various designs for the system and components are presented here.

DETAILED DESCRIPTION OF THE INVENTION/EMBODIMENTS

As shown by Gerard Van Bussel, in 2007 IOP Publishing Ltd, Journal of Physics Conf Series 75 (2007) 012010, "The science of making torque from wind", the rotor power coefficient of $C_{p,rotor}=2.5$ is achievable at a large diffuser area ratio of B>4.5. Thus, having the diffuser helps increase the efficiency of the turbine, with more power output, for the same given wind velocity at the intake, by having higher speed of air movement at the turbine, due to the diffuser effect. So, for the same city, and average wind velocity in that locality for a given season, one can get more electrical energy from the turbine, using the diffuser structure, as shown here in this invention.

In addition, Li et al, in Science Direct, Building and Environment, 42 (2007) 1135-1141, Elsevier Publishing, copyright 2006, "The assessment of the performance of a wind-catcher system using computational fluid dynamics", studied the windcatcher system performance, showing that the maximum velocity of the air entering the room is close to the external wind speed.

We are using the concepts above, to increase the performance/efficiency of a wind turbine, for a given wind speed, by using diffusers in various locations, in a wind tower, as described here, for a building or high-rise in a city, for a compact wind turbine.

Figure 3A:
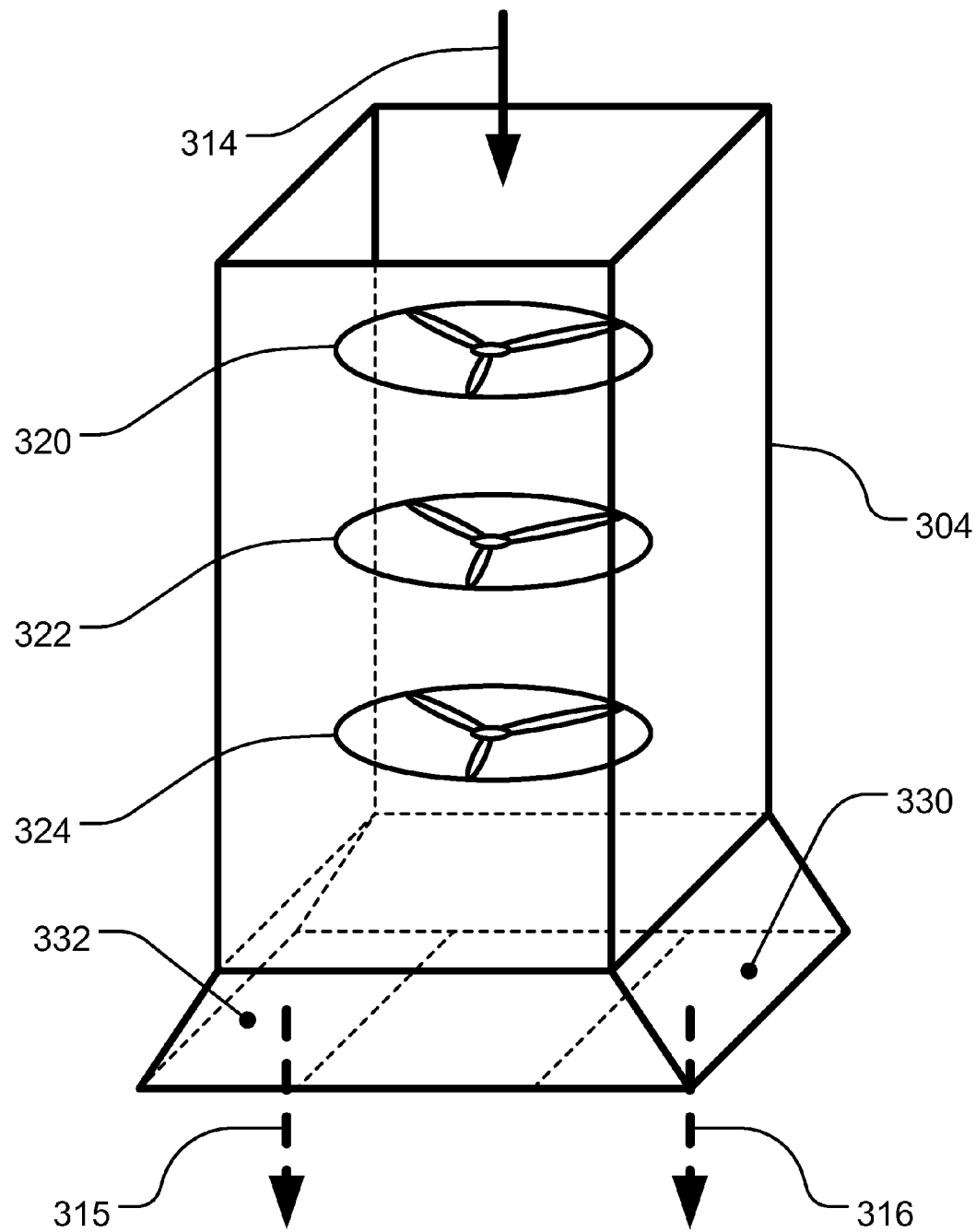
FIG. 3a—This displays a tower or shaft or well, which houses single or multi-turbines or rotors.
Figure 3B:
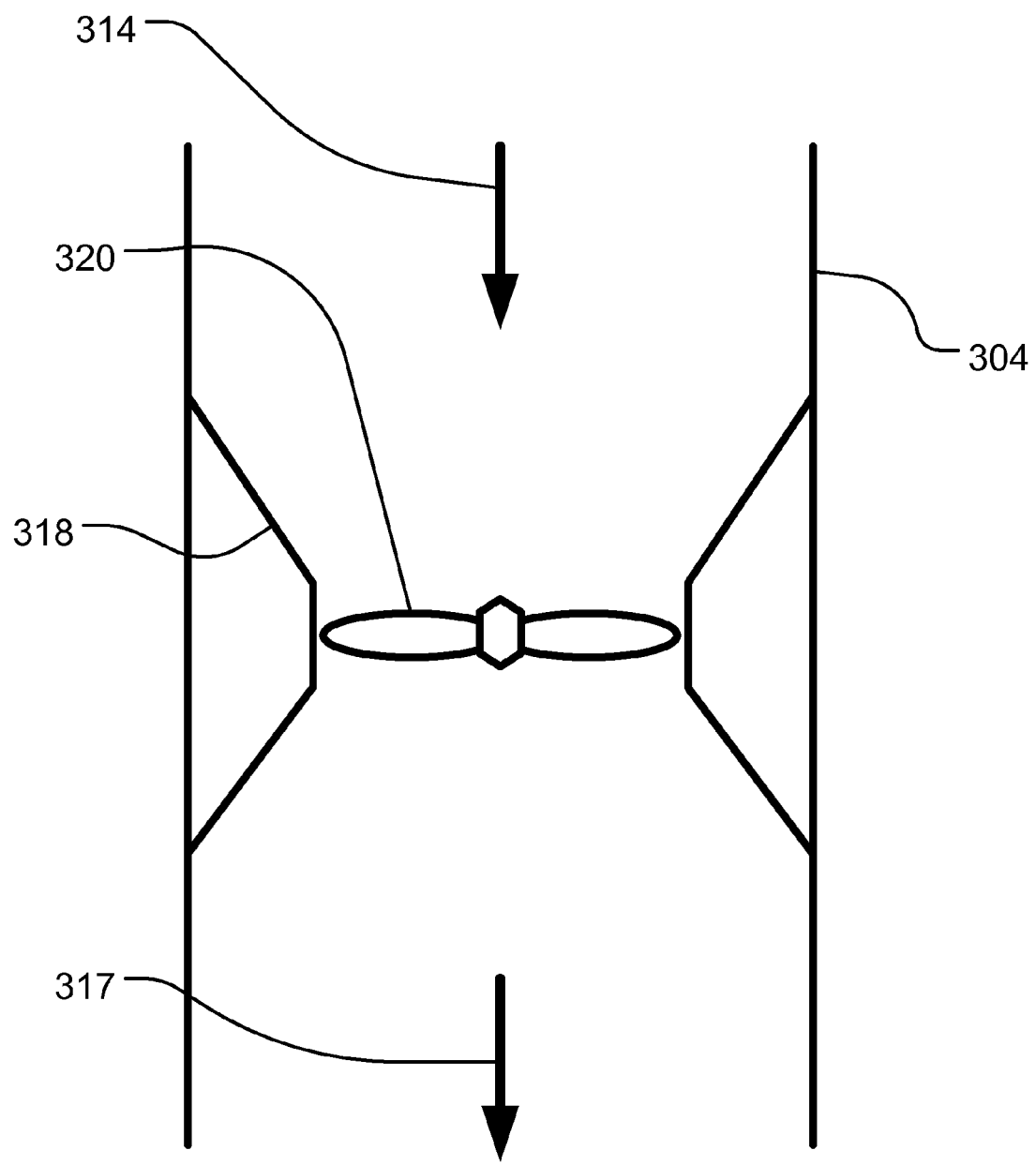
FIG. 3b shows a rotor in a well, plus a diffuser in the middle of the well.
Figure 4:
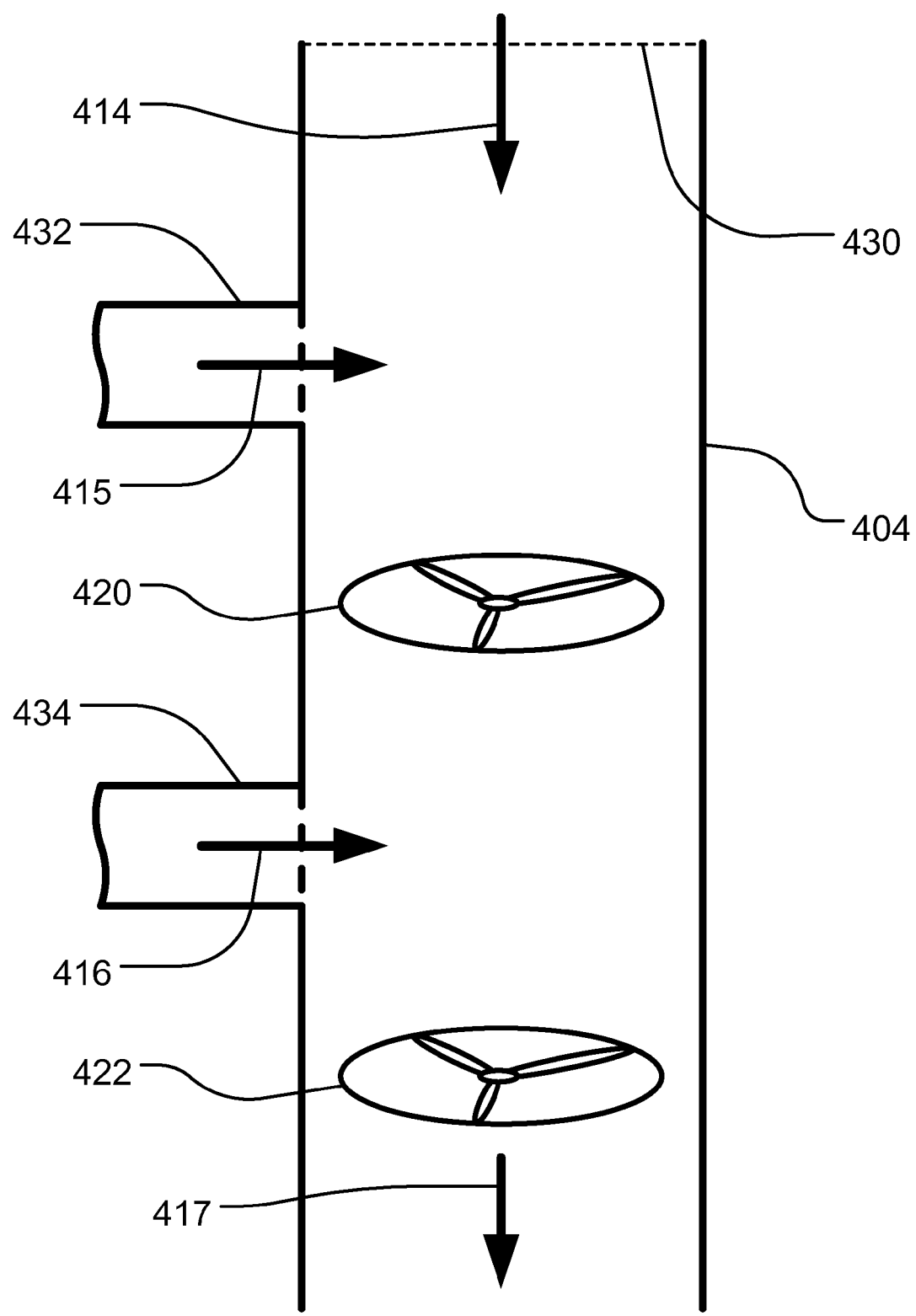
FIG. 4—illustration of a large turbine tower with multi/multiple inlets, which is for large structures, buildings, or high-rises, and one or more rotors/turbines.

Different embodiments and examples are listed here: FIG. 1 demonstrates a square Roof Top Inlet with diffused opening converging inside in all four sides, for top of the house or building. This inlet captures air wind horizontally in any directions (turbulence or laminar) and change the air speed to vertical direction into turbine tower or shaft (FIG. 3). The Roof Top Inlet assembly or cap can be any geometric configuration, e.g. square, rectangular, triangle, circle, and elliptic. This inlet mainly is used on rooftop of a building or structure as main inlet (FIG. 4 Inlet #1). A Single Inlet with one diffused opening converging inside (FIG. 2) also can be used on roof or on the side of any structure (FIG. 4 Inlet #2, 3).

Figure 1A:
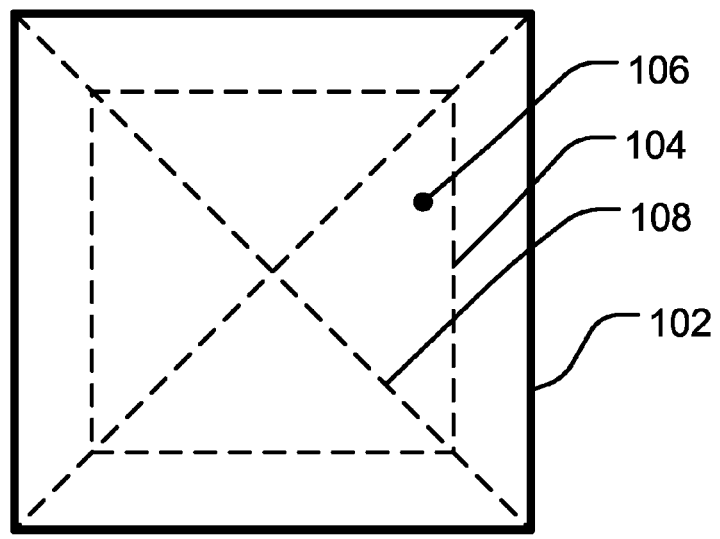
FIG. 1a—illustration of a roof top inlet with diffuser on each side of a square to capture air in any directions, from top view.
Figure 1B:
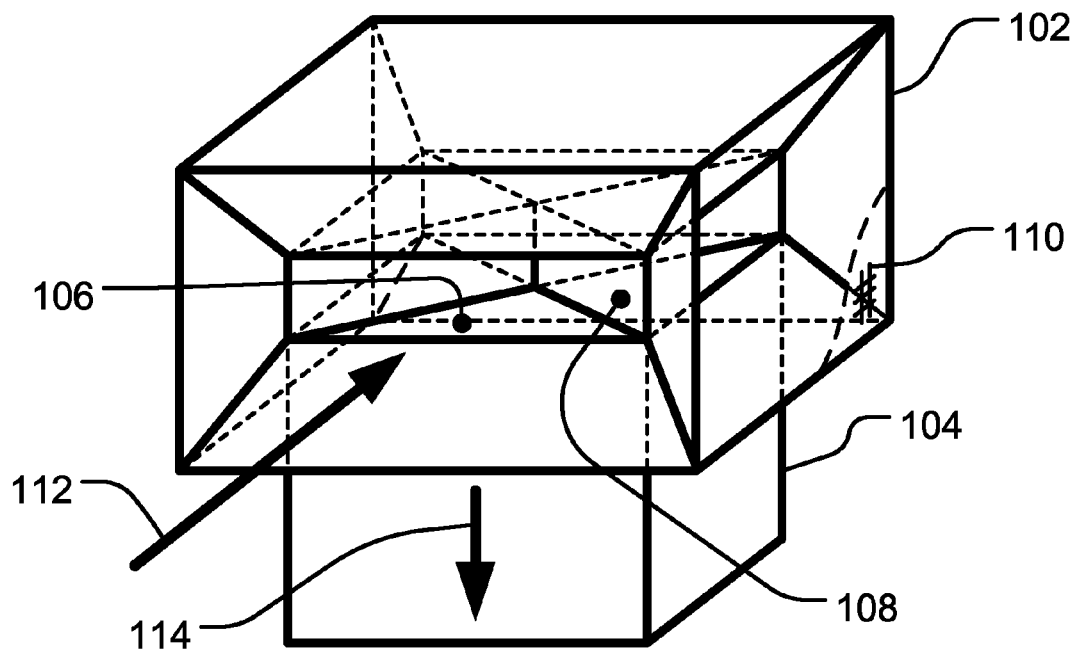
FIG. 1b shows the same as FIG. 1a, but from 3D view, from side.
Figure 1C:
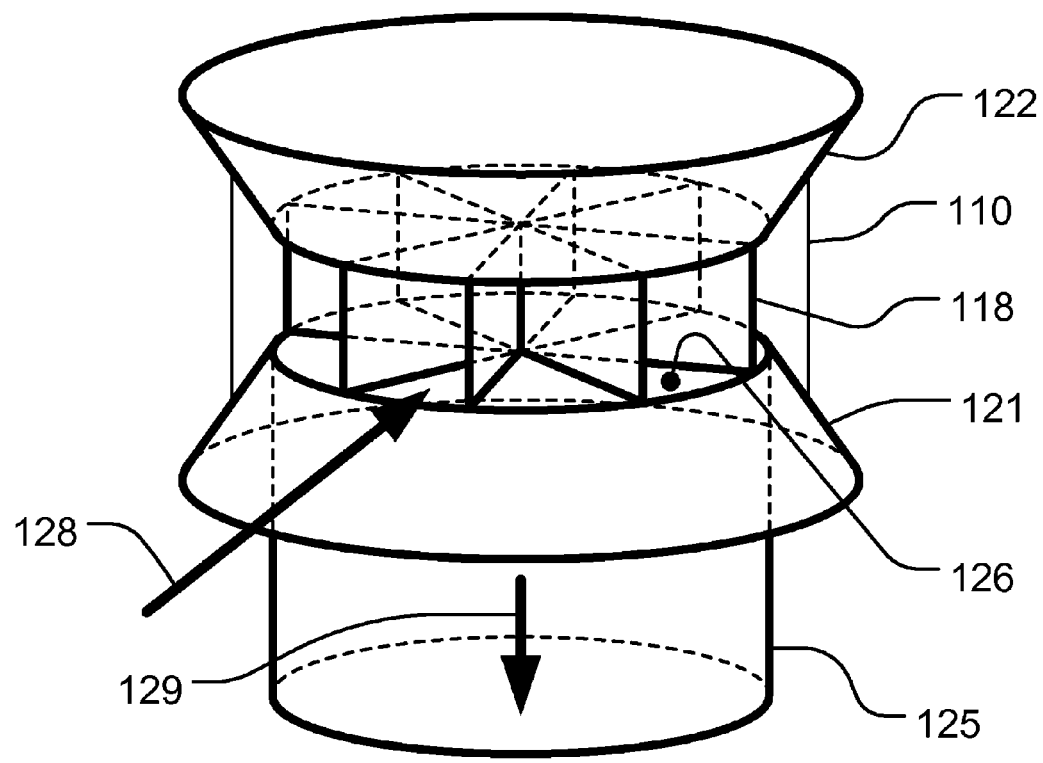
FIG. 1c shows the same as FIG. 1b, but for circular cross section.

FIG. 1a is the top view, with 102 being the outer edge for the diffuser of Roof Top Inlet assembly or cap (or inlet cap assembly), 110 being the screen or mesh, 106 being the inlet going downward, 108 vertical separator/divider/wall in-between, 112 the air going in, 114 the air going down, through vertical channel or well 104, as shown in FIG. 1b. Here are the components of FIGS. 1a-b:

102: Inlet
112: Air flow to inlet
108: divider
106: opening
104: Neck of cap assembly
114: Air flow in neck of cap assembly
110: wire mesh, to stop birds getting in FIG. 1c shows similar inlet cap assembly with a circular cross section for the well or channel, with the following parts or components, as an example:

121, 122: lower and upper cap Inlet
110: wire mesh
128: Air flow to inlet
129: Air flow in neck of cap assembly
118: one or more dividers
126: opening
125: Neck of cap assembly In FIG. 1c, a motor can rotate/move the partitions, walls, or dividers, in-between the inlets, in effect, re-sizing the inlet's openings and/or resizing the diffusers. In addition, alternatively, one can use extra wings and plates, to expand the area and size of the diffusers, as extra layers/shells, stretching/changing the cross section and outer shell for the diffusers, to change the air flow and air intake amount, similar to a louver or air register, with moveable plates or shutters, e.g. opening or closing, or redirecting the air flow.

Figure 1D:
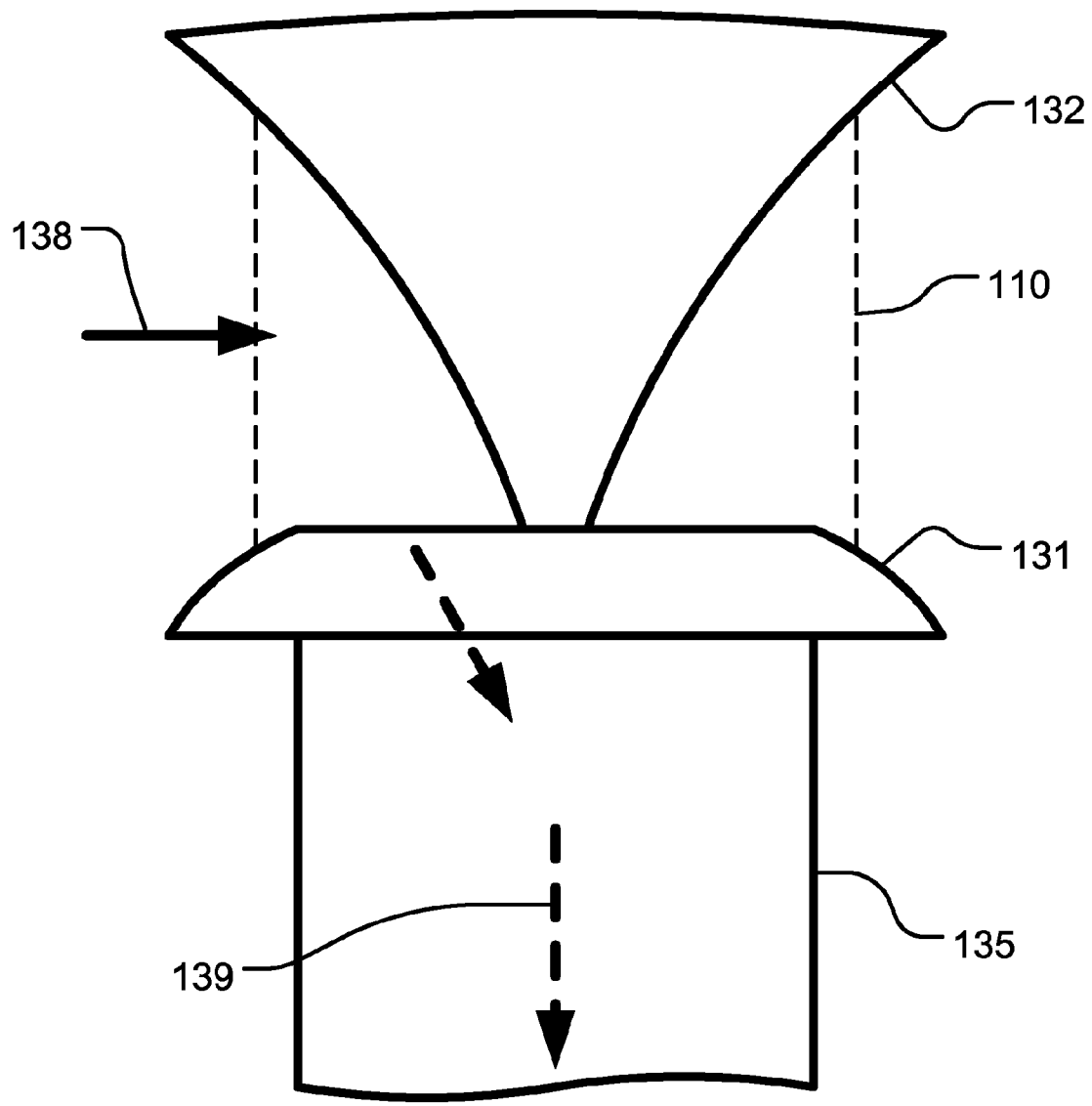
FIG. 1d shows another variation of FIG. 1b, from side view.

FIG. 1d is another configuration of inlet cap assembly, as an example, with the following parts or components:

131, 132: lower and upper cap Inlet
110: wire mesh
138: Air flow to inlet
139: Air flow in neck of cap assembly
135: Neck of cap assembly Roof Top Inlet can rotate. The controllers can close off the openings, using caps or shutters, to stop the flow, depending on the speed of wind, measured by the sensors on the buildings, e.g. for high speed winds that can damage the turbines. The inlet has a mesh or screen or filter for animals' prevention, to enter the system, e.g. birds or bats.

Figure 1E:
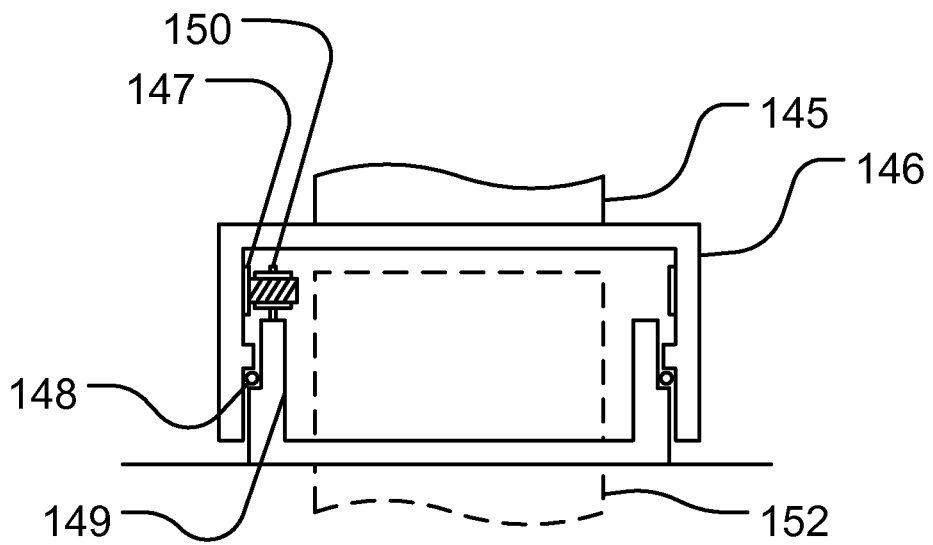
FIG. 1e shows the top part of the inlet cap assembly rotating horizontally, from side view.
Figure 1F:
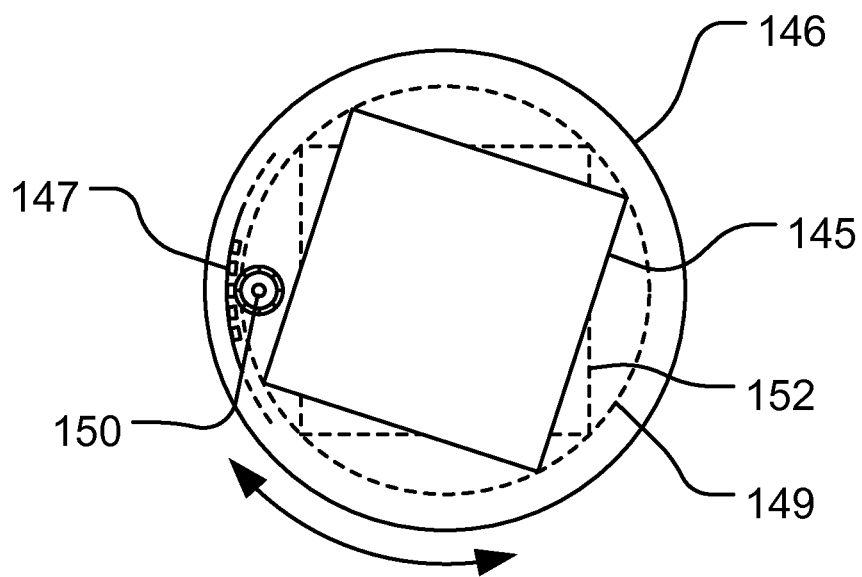
FIG. 1f shows the top part of the inlet cap assembly rotating horizontally, from top view.

As shown in FIGS. 1e-f, the side view and top view of the inlet cap assembly, with components 145-146 rotating (horizontally), with respect to the rest of the components underneath them. The components are, as an example:

145: Neck of cap assembly
146: rotating base (e.g., circular)
147: track or gear inside rotating base
150: motor or driver on the stationary base (149), for rotating the head assembly by engaging the track/gear on/attached to the rotating base.
152: well
148: wheel or ball bearing allowing for the rotation of the rotating base on the stationary base.

Figure 1G:
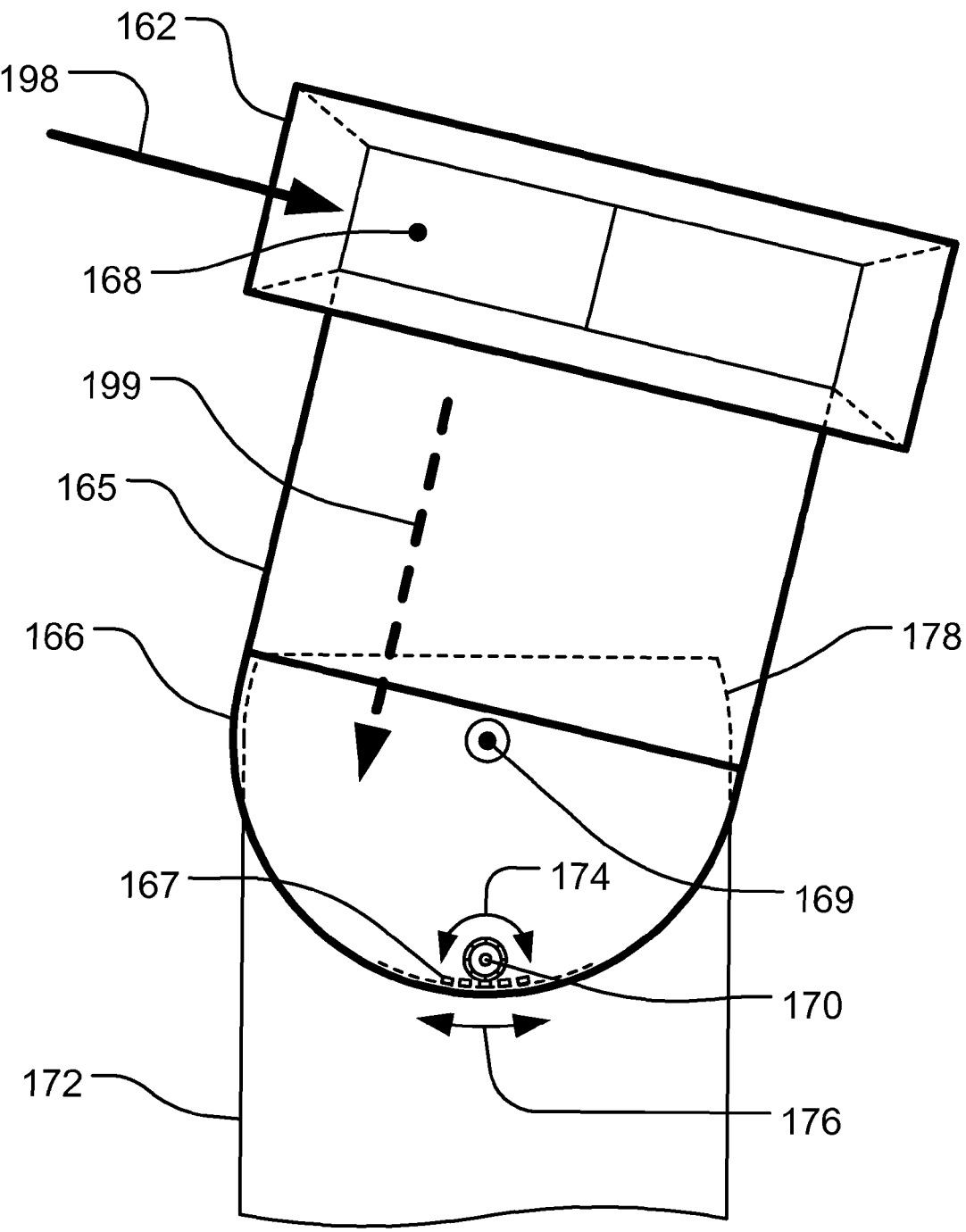
FIG. 1g shows the top part of the inlet cap assembly tilting vertically, from side view.

As shown in FIG. 1g, the side view of the inlet cap assembly, with components on top side tilting (vertically), with respect to the rest of the components underneath them. The components are, as an example:

162: Inlet
198: Air flow to inlet
168: divider
165: Neck of cap assembly (covered from the sides)
199: Air flow in neck of cap assembly
166: Hinge extension or attachment to the neck
169: Pivot
167: track or gear on hinge extension
170: motor or driver for rotating the head assembly about the pivot.
174: rotation of motor/driver
176: rotation of head assembly
172: well
178: Curved (e.g., circular) edge or extension of well blocks the opening between hinge extensions (166) when the head assembly is rotated.

This structure (described for various embodiments here) can be used as a cooling tower, to divert the wind in for a building, as well.

We can close off some intakes or outlets, depending on the weather around the building to optimize, for multiple intakes or outlets, for optimum performance of the turbines or turbine, which can be controlled by a user manually, or by a computer automatically. The controller or central computer or server controls all shutters, caps, or intakes, or exhaust pipes or channels or openings, using weather data feed and local sensors, monitoring real-time or predicting the weather in future, based on weather models or forecasts, or analyzed/predicted by a third party/system or remote party or service or system. The optimum operation and status of the shutters and other elements and components in the generator or turbine(s) are tested and tabulated (or graphed or calibrated or predetermined or analyzed), in a database or memory unit/storage or a computer, for operation and control of the shutters and other elements and components in the generator or turbine(s).

Figure 20:
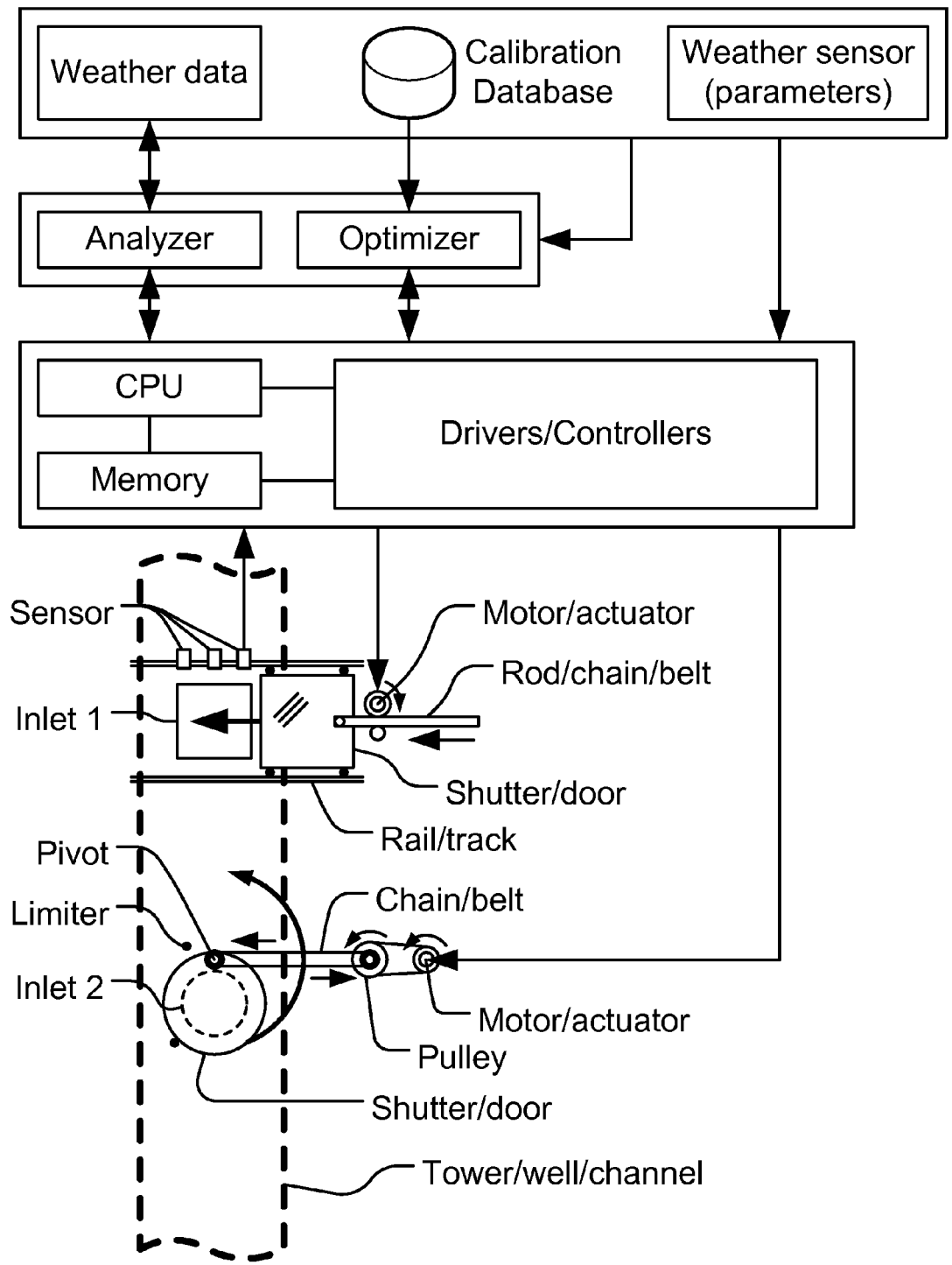
FIG. 20 shows a system, with controllers, shutters, and mechanical components, as an example.

As shown in FIG. 20, the weather data and weather parameter calibration database (versus the tower and turbine parameters and settings) are fed to the analyzer and optimizer systems, modules, or subsystems, to analyze the data. This is also accompanied with data/weather parameters measured by sensors at various locations, near or far from the tower, to complete the weather forecast, in terms of speed, pressure, humidity, turbulence, rain, particle content, density, and other parameters for air, at present and in the near future, e.g. within few hours, days, or weeks.

The analyzed and optimized result, for operation of the shutters, valves, intakes, outlets, exhausts, exits, rotor, generator, turbine(s), and fan/motors (based on prior calibrated and studied data, e.g. using neural networks and fuzzy logic for training, analysis, and learning, from past data/behavior/trends for complex systems), will be fed to a CPU/processor/computer/server/microprocessor/HQ, with a memory unit to store the results (or multiple storage units), which sends commands and instructions to the controllers or drivers, which e.g. can drive/move/open/close/half-open/partially open the shutters, motors, chains, doors, inclined surfaces, and other components of towers, rotors, generators, turbines, mechanical pieces, directional/tilted intakes, height and position of intake cap assembly at the roof or top of the building/structure, wheels under the legs of the structure to position the structure correctly, or array/assembly of rotors, in terms of position, height, and direction, e.g. as shown in FIG. 20.

As shown in FIG. 20, one example of the command is to send a signal or instructions to the motor/actuator, with a rod/chain/belt, to move or open the shutter or door, e.g. on a rail or track, to open/close the inlet 1, monitored by the sensors, e.g. to avoid the overstretching the shutter in either directions, e.g. to properly close the shutter, e.g. based on the exact percentage, e.g. 58 percent shutter closed. Sensors also feed the CPU and drivers/controllers, as the exact position and status of the shutter(s).

As shown in FIG. 20, one example of the shutter closing mechanism is to use motor/actuator, with a chain/belt/string/cable/rod or the like, using a pulley, to rotationally close/open the shutter(s), simultaneously or one at a time, with a pivot or hinge, and one or more limiters or delimiters or tongues (e.g. to avoid overstretching or damaging the shutters, during opening or closing operations), e.g. for inlet 2 in the tower in FIG. 20.

Any other mechanism can also be used which are common and well known in the industry, to open or close the valve or shutters, e.g. ball valves, or valves with diaphragms/needles.

Figure 6:
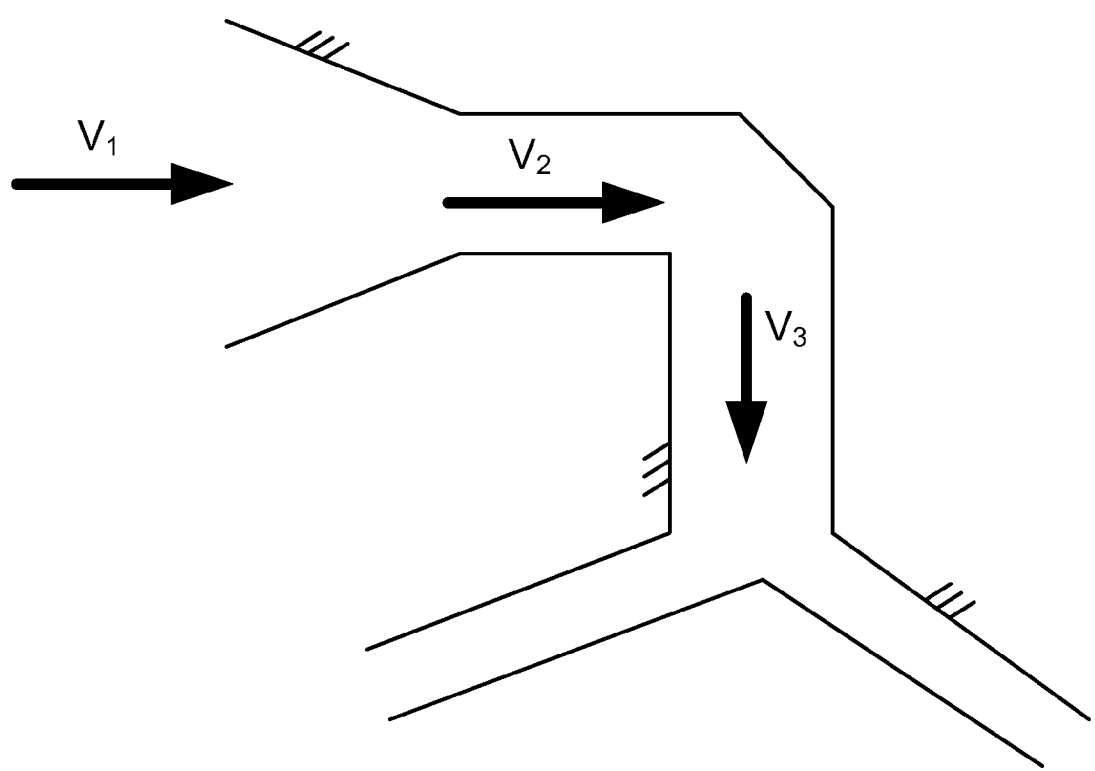
FIG. 6—Demonstrates the various air speed into the inlet, tower, and outlet.
Figure 10:
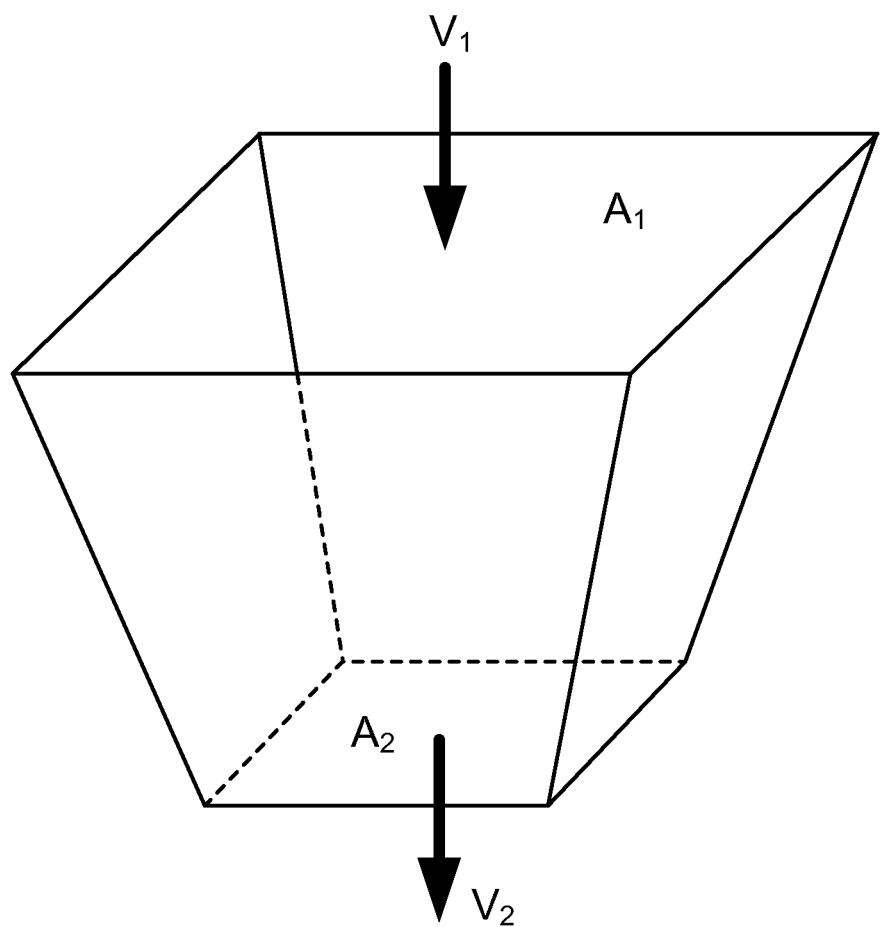
FIG. 10—Shows the relationship between the area and speed at the two ends of a diffuser or channel.

An embodiment of the invention is a system of air draft created through high and low pressure formed by air movement around a building or structure. FIG. 6 illustrates the overall air velocity and directions through the system (e.g. Inlet, Tower, and Outlet), and FIG. 10 shows relation between two ends of a diffuser with respect to area and velocity, as an example.

FIG. 3 shows a turbine tower with air flows through the tower in one direction and exiting through outlets. Depending on the size of a building, this tower could house single or multi-wind turbines (FIG. 4), with additional side inlets benefitting from air draft created by various tall buildings or high rises in large metropolitan area (air tunnel effect, or urban canyon). The present invention includes an embodiment (FIG. 5) where a turbine tower can be next to an elevator shaft in tall buildings, to take advantage of the air disbursement created by elevators movement, and have an easy access for maintenance of the turbines, plus available space and convenience for geometry of the structure. The air can come in from different floor levels, and has one or more outlets at the bottom with shutter or damper(s) to partially or fully close off the flow of air (e.g. 35 percent closed shutter), to adjust for the speed or operation of all or some of the turbines/generators/blade sets/rotors.

In the elevator shaft type opening (or tower hollow shaft or opening or well), before and after each turbine or rotor, one can add a diffuser on the inside wall (as one embodiment), to direct the air toward the blades. Thus, the diffusers are used at intake(s)/entrances, outlet(s)/exits, or on the walls of the hollow tower opening, or a combination of the above (as different embodiments). The position of the opening can be the same as elevator shaft opening, or separate/isolated opening in parallel/close to the elevator shaft.

The shaft of the generator and rotor is hollow, in one embodiment, to let the air passes easily. As one embodiment, the rotor front is aerodynamics/curved shape, so that it does not hinder or reduce or waste the wind or air energy or momentum.

As a part of one embodiment, a solar panel can be mounted on top of the Roof Top Inlet to maximize energy output collectively (FIG. 7), with air movement around the inlet, which helps to cool down the solar panel, which will avoid overheating on the solar cell panels, which results in a higher efficiency for the solar panel and electrical generation.

Figure 16:
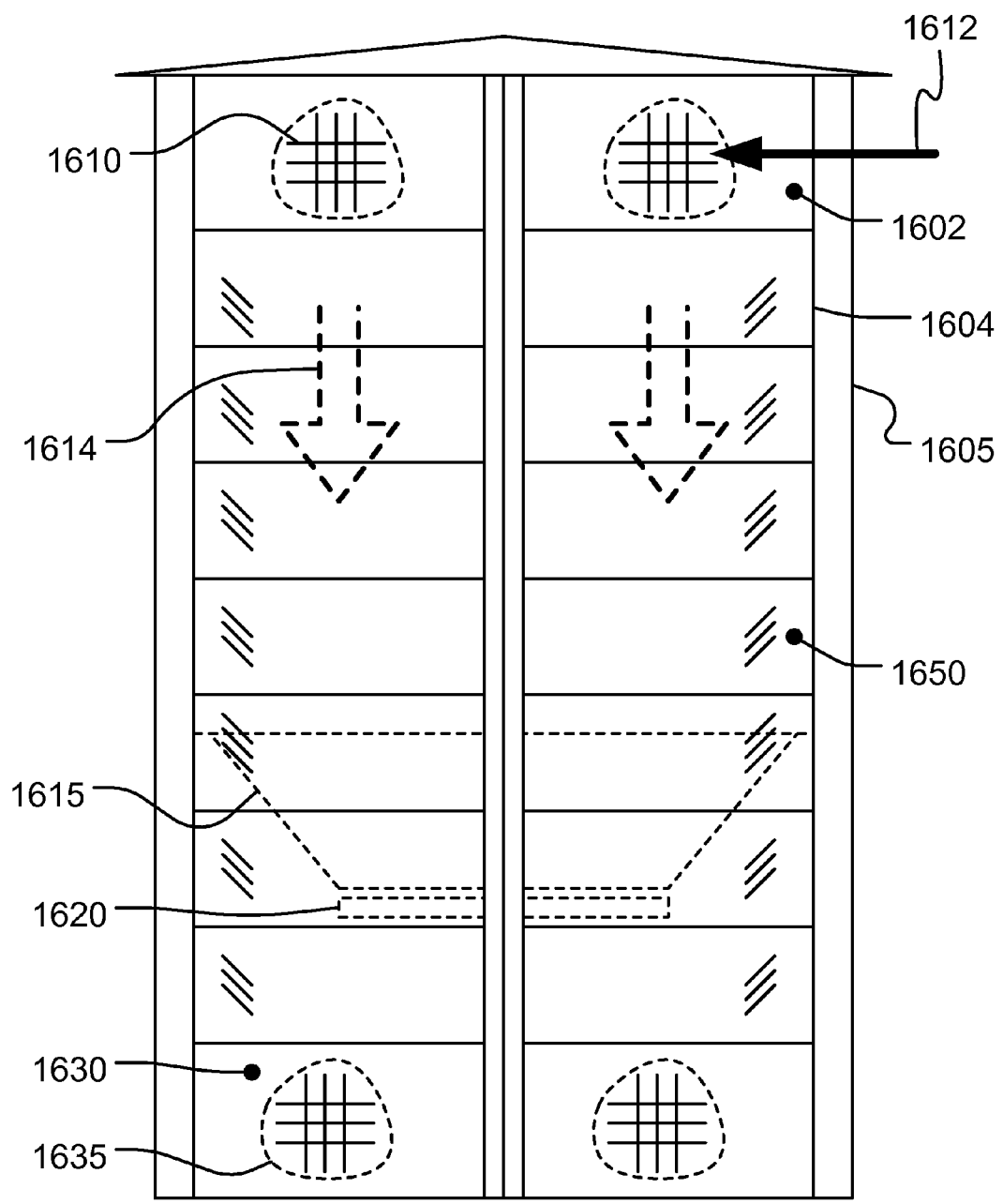
FIG. 16 shows modularized/skeleton structure of a unit, as an example.

As one embodiment, the diffuser looks like a funnel of different cross sections. It can be modularized, in pieces, assembled together (e.g. as in FIG. 16), with extensions optional, on the attic. With modular design (with panels attached on skeleton or stick structure, using nuts and bolts), the price decreases, while the variety and customization are expanding and improving. Multiple wells or shaft hollow structures can be parallel (or in series), merging at one point, for a single turbine, to feed the air and rotate the turbine. (Please note that shaft has 2 usages and meanings here: one is the shaft referring to the hollow well, and the second one is turbine shaft or axis or rod, which refers to the axis of rotation for the turbine. However, it is clear from the context that which one is which.) The components for FIG. 16 are, as an example:

1602: Inlet
1610: wire mesh
1612: Air flow to inlet
1605: Structural support, e.g., steel assembly/column (e.g., 8"×8" steel column)
1614: air flow in the assembly
1650: knock down panels
1604: neck of the assembly
1615: diffuser inside channel
1620: turbine
1630: exit or outlet
1635: wire mesh As one embodiment, the intake(s) can be on the side of a building between two or more windows, between multiple high rises on a windy city or near water, to gather lots of wind energy. As one embodiment, the intake(s) and the whole system can be in the middle of the sea or arctic region (or installed on another planet) or floating in the air or near the sea or on an island or structure (e.g. artificial island or platform or floating structure).

As one embodiment, it can be a labyrinth of canals for air, for inlets and outlets, closed off or opened, or diverted, depending on optimum pressure, speed of air, and direction outside (as weather parameters), as measured by sensors around the building or by weather forecast, for best performance/efficiency of the wind-based generators, inside or close to a building, as a separate structure.

As one embodiment, the structure and components can be of any material or any shape. As one embodiment, the structure uses a wind catcher, to divert the air in (with louvers and shutters or doors). As one embodiment, we can have e.g. 3 or more inlets at different floors, e.g. in a 50-story high-rise, with multiple turbines corresponding to/fed by each of those inlets, which may or may not be connected together in a shaft (as different possible designs for the system), in the high-rise building or tower or structure or mountain/hill/cliff side or face (as a natural structure).

Here are the figures, as different embodiments and examples: FIG. 1 is an illustration of a roof top inlet with diffuser on each side of a square to capture air in any directions. The diffusers' walls can be either slopped or curved. Overall inlet shape can be square, rectangular, circle, elliptical, or triangle. This diffuser will capture air horizontally and change it to vertical direction, into turbine tower or shaft. In one embodiment, the direction or level of the roof-top assembly or cap or hood can be angled such that the inlets are tilted upward or downward, to capture winds that are not horizontal. In one embodiment, the roof-top assembly or cap or hood can be rotated horizontally, to get the wind from different directions, during a day, to optimize the performance.

In one embodiment, the rotation and tilting are done manually by a user using a lever or gear. In one embodiment, the rotation and/or tilting are done automatically or remotely by a computer or controller, using a lever or gear, and step motor or motor or spring, based on the data about the current direction of the local wind or near future direction of the local wind, near the assembly, obtained from the weather service or from news feed or from local sensors on the rooftop or assembly, to measure the speed and direction of the wind and pressure of air and humidity and turbulence of the air, as some of the relevant parameters, to optimize the operation and efficiency of the assembly and turbine. For example, the storm or high wind or heavy rain may not be good (e.g. damaging) for the operation of the turbine, and thus, the user or the system/controller shuts off the turbine and closes off all the inlets, for that period of time.

For FIG. 1, the structure under the top hood or cap for the rooftop assembly can be in any form, geometrical shape, or shape. One embodiment is shown in FIG. 1, but it serves as an example, and not representing all possible shapes and structures.

In one embodiment, the cross section of the top view for the roof-top assembly is a circle, with multiple radial dividers for different directions, with all dividers ending toward the middle of the circle or center of the roof-top assembly. In one embodiment, the radial dividers are adjustable, e.g. rotatable, in horizontal direction, from the top view, to adjust the largest opening toward the most wind force or wind direction, for optimum/maximum operations or air intake or air/wind volume/momentum/energy capture, e.g. per minute or second. Of course, in the extreme cases, at storm conditions, one closes off the intake, partially or fully, or reposition/rotate the intake direction(s), to avoid damage to the assembly and system. Thus, the speed and direction of the wind are calibrated and tabulated beforehand for optimum operations/higher electrical generation efficiency, and less risk of damage/maintenance.

Figure 2:
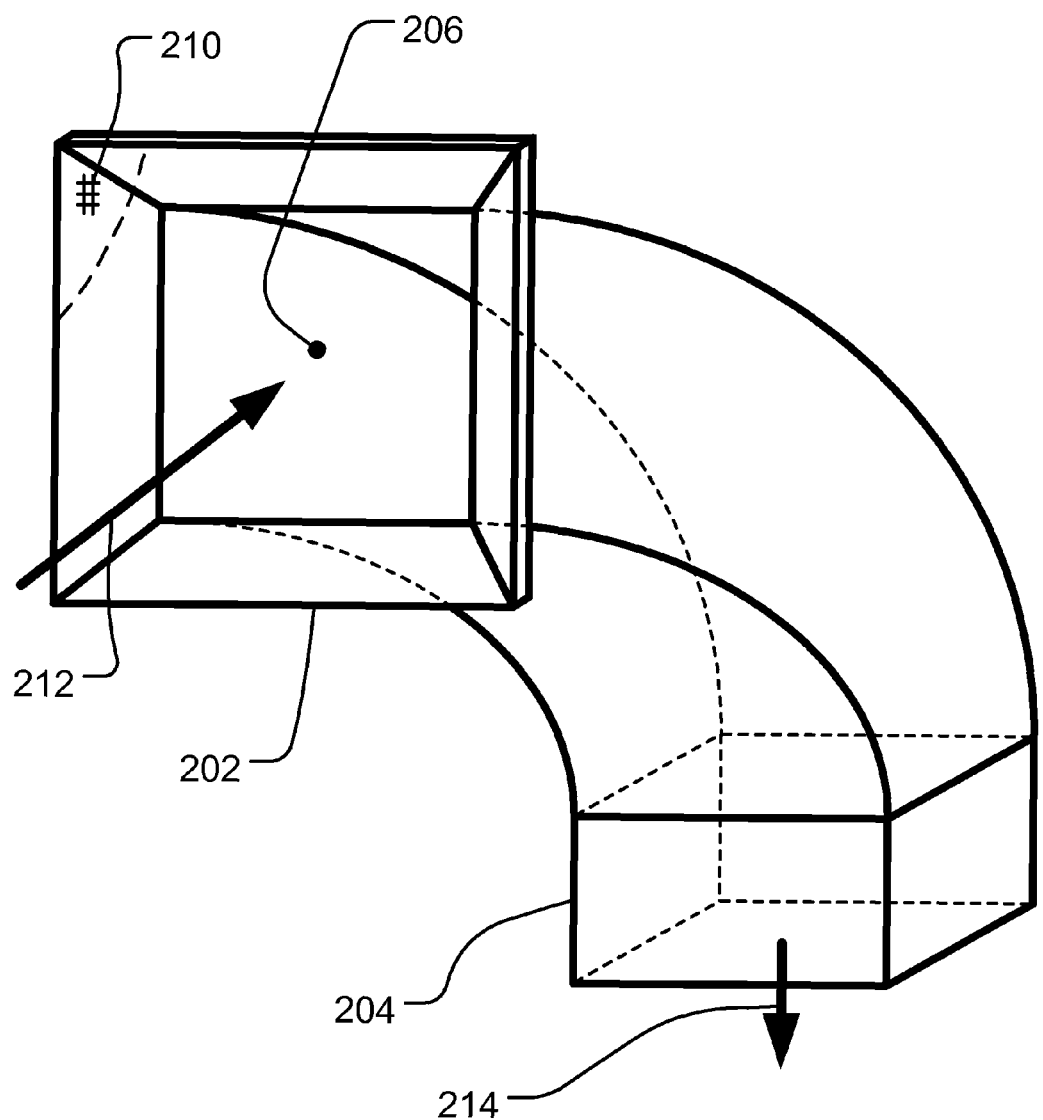
FIG. 2—This shows a roof top or side inlet with single diffuser, as an example.

FIG. 2 shows a roof top or side inlet with single diffuser. The diffuser's walls can be either slopped or curved. The overall shape can be square, rectangular, circle, elliptical, or triangle (or a mixture, or a conversion from one to another, e.g. conversion gradually from a circle to a rectangle cross section, e.g. for a better efficiency). This diffuser will capture air horizontally and change it to vertical, into turbine tower or shaft. The components are, as an example:
- 202: Inlet
- 212: Air flow to inlet
- 206: opening
- 204: well or the neck of cap assembly
- 214: Air flow in well or the neck of cap assembly
- 210: wire mesh FIG. 3 displays a tower or shaft or well or channel, which houses single or multi-turbines. Outlets are also shown for air to exit out from turbine tower. These towers can be square, rectangular, circle, or other shapes, in the cross section. Air is entering from various inlet(s) into the tower and exiting out from various outlet(s), at horizontally, vertically, or tilted direction(s). The components for FIG. 3a are, as an example:
- 314: Air flow in well
- 315, 316: Air flow through outlet
- 330, 332: outlets
- 320, 322, 324: one or more turbines
- 304: well/channel/tower shaft or hollow middle or elevator-shaft-type structure FIG. 3b shows one or more diffusers in the middle of the well for the tower, with the following components, as an example, to redirect the air flow:
- 314: Air flow in well
- 320: turbine
- 304: well/channel
- 317: Air flow passed turbine in well/channel FIG. 4 is an illustration of a large turbine tower with multiple inlets, and one or more turbines or blade sets or rotors (rotating or assembled on one or more shafts or rods or rotational axes, aligned or not-aligned on the shaft directions, as different embodiments). The turbines can be separate in one example. In one embodiment, the turbines are cascaded or connected to each other, via common axis, or via axis connected by gears or intermediate gearbox or transmission device. One or more turbines or blade sets can be operational one at a time, or more than one at a time, as different embodiments, depending on the efficiency/optimization of generator/turbine, based on the wind speed (e.g. measured by anemometer), direction (e.g. measured by wind vane), humidity, pollen count (as a measure of the number of particles in the air for a specific volume, at a given time for a location, as a measure of the density, momentum, and abrasiveness of the air, to accordingly adjust the air intake, to reduce damages or optimize electrical/energy generation), and pressure, among other weather parameters, at different heights/tower positions.

For example, in one situation, if the wind is very strong and at desirable speed, at the current time of today, at the inlet number 2, or 432, but very weak speed at the inlet number 3, or 434, position (not efficient), then one can close off (using shutters, caps, sliders, blades, plates, or doors) the inlet(s) corresponding to the height or position number 3, and leave the ones for position number 2 open.

The components for FIG. 4 are, as an example:
- 430: Inlet 1 (e.g., main inlet)
- 414: Air flow through inlet 1 (or main inlet)
- 432, 434: one or more side inlets or additional inlets (number 2 and 3)
- 415, 416: Air flow through side/additional inlets
- 420, 422: one or more turbines
- 404: well/channel
- 417: Air flow passed turbine in well/channel Alternatively, in one embodiment, one can use a sliding/ladder structure, in which the inlets, such as inlets number 2 and 3, are all on the slide or rail, and the shutters or caps are sliding on the side of the tower, vertically or horizontally, to close none, one, some, or all of the inlets at different heights, to optimize the operation of the turbine or set of blades. For example, the controller or the user/administrator/operator can close off the inlets number 2 or 3 or both, if needed, by sliding the shutters or plates located on a rail vertically on the side of the tower, inside or outside the shell or skin or body or wall of the tower, to close off/block the air entrance partially or fully, to adjust the air input at different levels and heights for different turbines or blade sets. In one embodiment, the sliders or shutters can fold or go on top of each other or slide parallel to each other, for storage, or when the inlets are open. This tower is for large structures, buildings, or high-rises.

Figure 5:
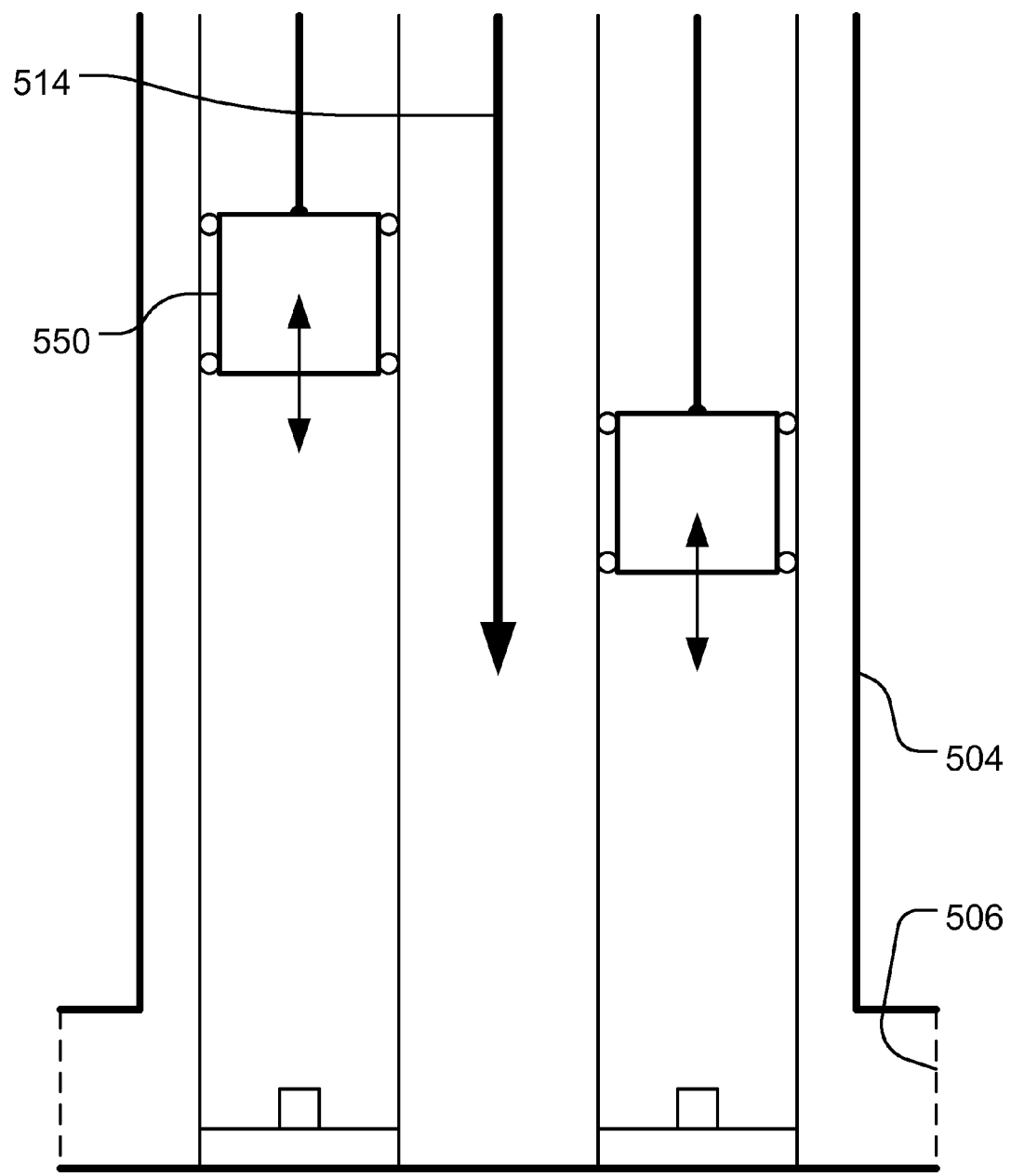
FIG. 5—A turbine tower can be situated next to or within or parallel to an elevator's shaft or multiple shafts/wells.

FIG. 5 shows a turbine tower which can be situated next to one or more elevators' shaft, which in turn feed the air into the turbine tower along with various inlets, and is convenient for the geometry of the structure and installation/maintenance. There is also a drain line on the bottom of the shaft that collects the rain and snow water and directs the collected water under the building, outside the system, so that the generator is not flooded by water. The well is a part of the elevator shaft structure/space/surroundings, in one example. The well is separate from/divided/isolated from the elevator shaft structure/space/surroundings, in one example. The components for FIG. 5 are, as an example:
- 514: Air flow through shaft
- 504: well/channel via elevator shaft
- 506: damper/outlet, which may be closed.
- 550: elevator cabin FIG. 6 demonstrates the various air speed into the inlet, tower, and outlet, as a network, labyrinth, branches, or distribution of air, with various cross sections and angles or slopes (e.g. as a way of speed control or adjustment, using shutters, to redirect or close off a branch, or as a way of air distribution during different weather conditions, to multiple turbines, e.g. for periods of strong wind).

Figure 7:
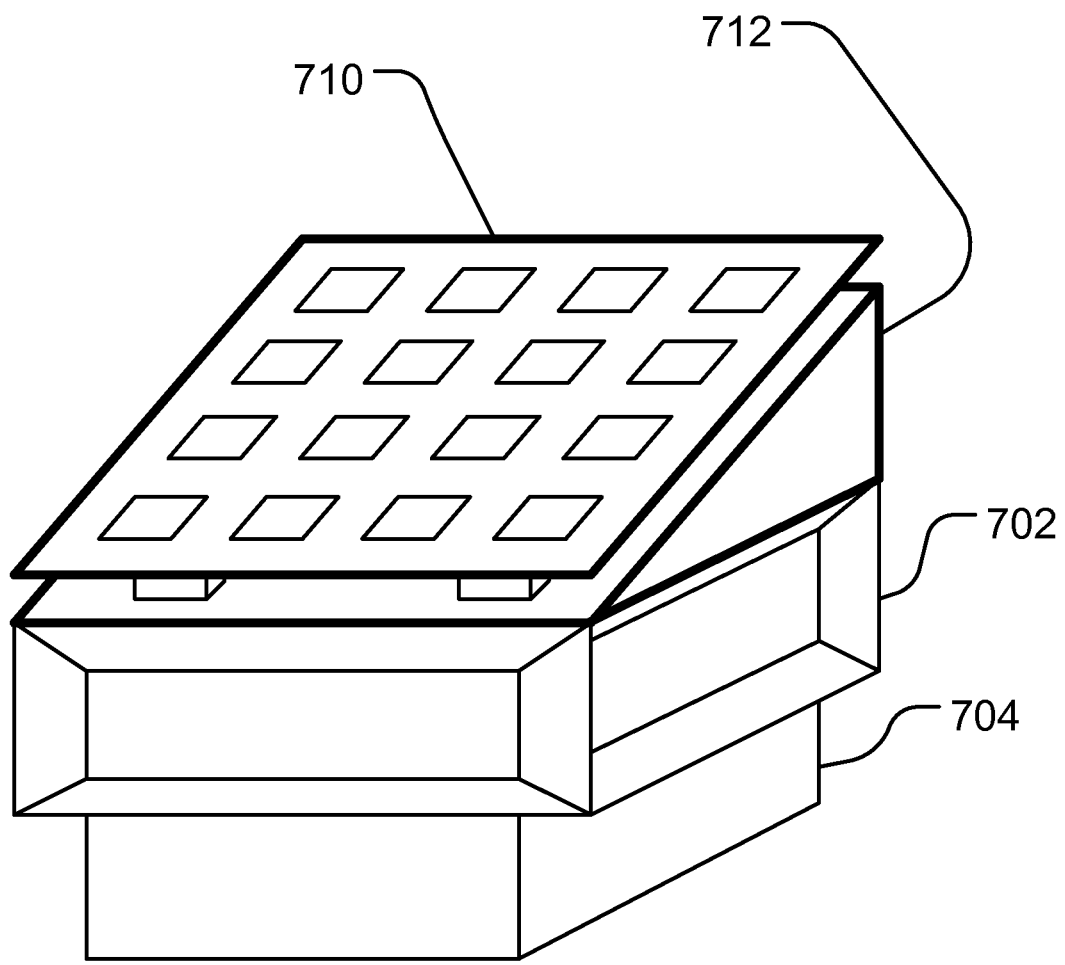
FIG. 7—Demonstration of a roof top diffuser with solar panel and cooling gap for the panel.

FIG. 7 demonstrates a rooftop diffuser with solar panel and cooling gap for the panel (e.g. a tilted surface on the top, to let the solar panel get some air underneath, to cool down, for better operation of the panel). The components for FIG. 7 are, as an example:
- 702: Inlet of cap assembly
- 704: neck of cap assembly
- 710: Solar panel
- 712: Inclined surface/plate, for adjusting the angle of solar panel. Inclined section may contain solar panel cooling unit, e.g. liquid or gas or water pipes. Inclined section may be adjustable, in terms of angle of the surface, with respect to the horizontal plane.

Figure 8:
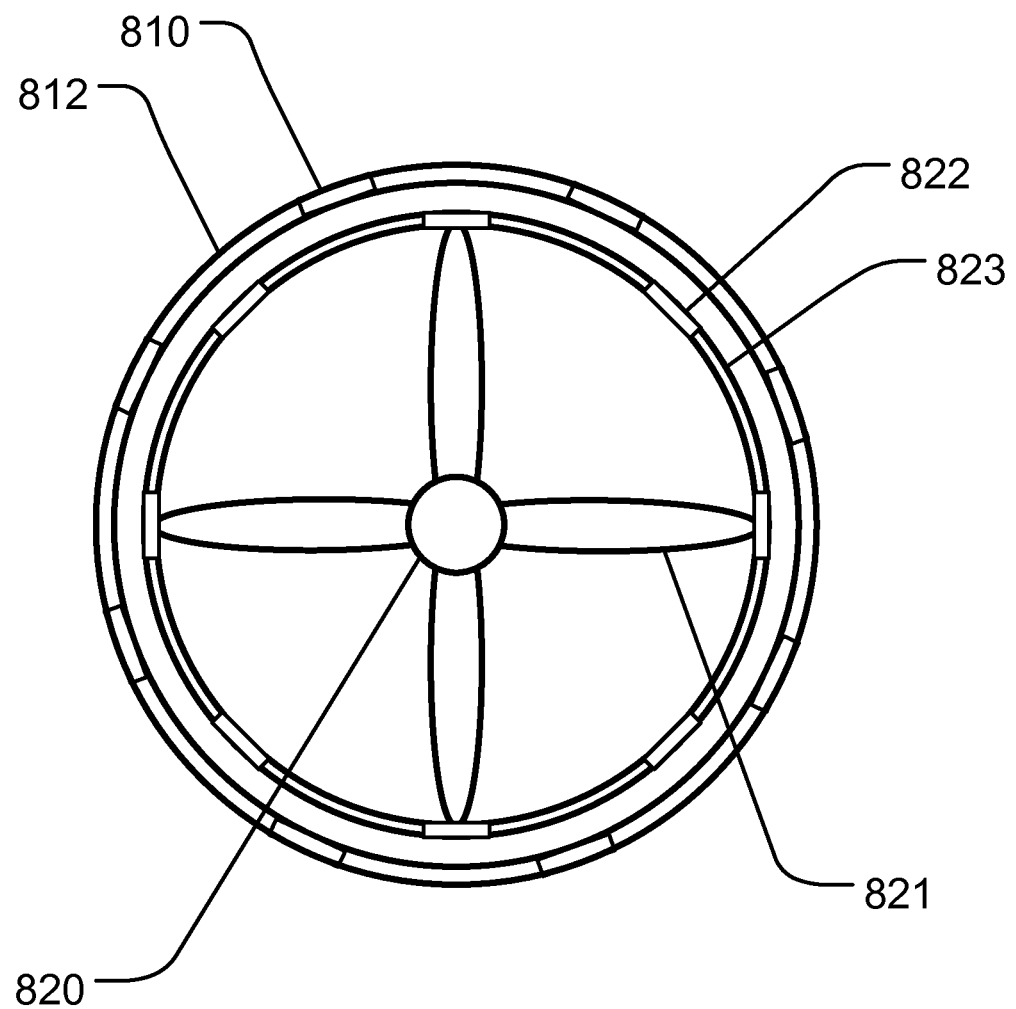
FIG. 8—Displays a turbine with generator at the perimeter, which eliminates the weight of the rotor and generator in center of the turbine.

FIG. 8 displays a turbine with generator located at the perimeter, which eliminates the weight of the rotor and generator in center of the turbine. The magnetic part of the generator is at the perimeter, at the circle boundary, making the turbine more compact and light weight, ideal for this application, with house or building structure. This is a novel design for the compact turbine, fit for inside building/in city operations. The components for FIG. 8 are, as an example:
- 820: Turbine rotor
- 821: turbine blade(s)
- 823: rotating ring support attached to the blades or the turbine.
- 822: Magnets (e.g., permanent) attached to the supporting ring.
- 812: Stationary outside ring for supporting the generator (e.g., coils)
- 810: Generator, e.g., coils.

Figure 9:
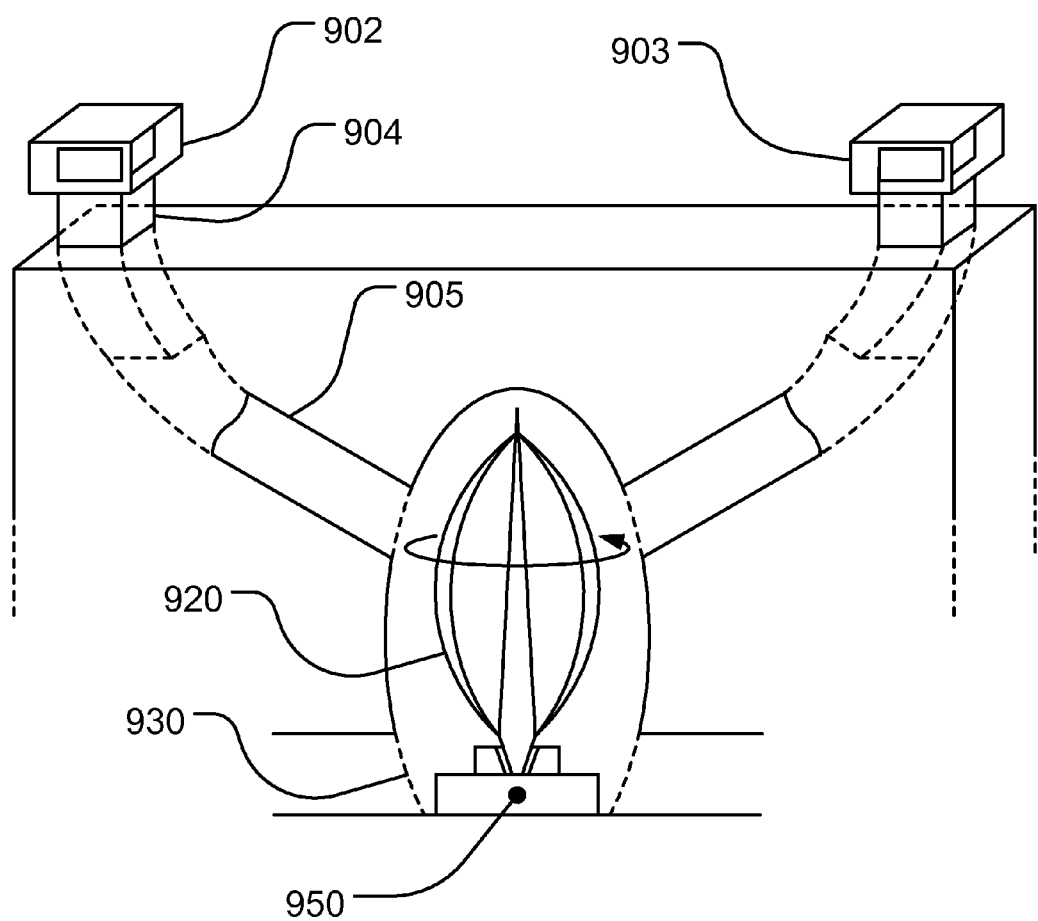
FIG. 9—Displays a vertical axis turbine, with multiple inlets/inputs.

Note that the shaft or axis of turbines can be aligned/installed horizontally, vertically, or tilted, with respect to the wall or structure of the tower or building. FIG. 9 displays a vertical axis turbine, with generator at the bottom position, for a normal conventional operation, with air coming from various locations and pipes, converging on this turbine (as one embodiment). It can have a helix structure for its blade, as one example. The components for FIG. 9 are, as an example:
- 902, 903: one or more inlets for air flow
- 904: neck of cap assembly
- 905: well/channel
- 920: vertical axis turbine
- 930: outlet for air flow
- 950: Generator This can be installed with its shaft/axis/axis of rotation horizontally attached to both walls of the tower (as one embodiment), for the air coming from the top, to rotate the blades accordingly, inside said tower cavity/tunnel/shaft/housing/structure/elevator-type shaft.

FIG. 10 shows the relationship between the area and speed at the two ends of a diffuser. For example, as the diffuser narrows down, as a funnel, the cross section area shrinks ($A_1 > A_2$), but the speed of the air movement increases ($V_1 < V_2$). This is true up to some limit, i.e. for an extremely narrow $A_2$, the advantage of larger $V_2$ is gradually diminished/gone. So, one cannot choose an extremely narrow/small $A_2$ for this design.

To optimize or reduce risk of damage, one can adjust the air flow at intake, outlet, or in the tower shaft/hollow pipe/opening/channel/duct/tube (similar to the elevator shaft opening/hollow structure), using shutters, doors, caps, dampers, or the like, partially or fully, one at a time, or in combinations, to formulate or calibrate or adjust the air intake/speed, at different parts of the tower height/locations.

Figure 13:
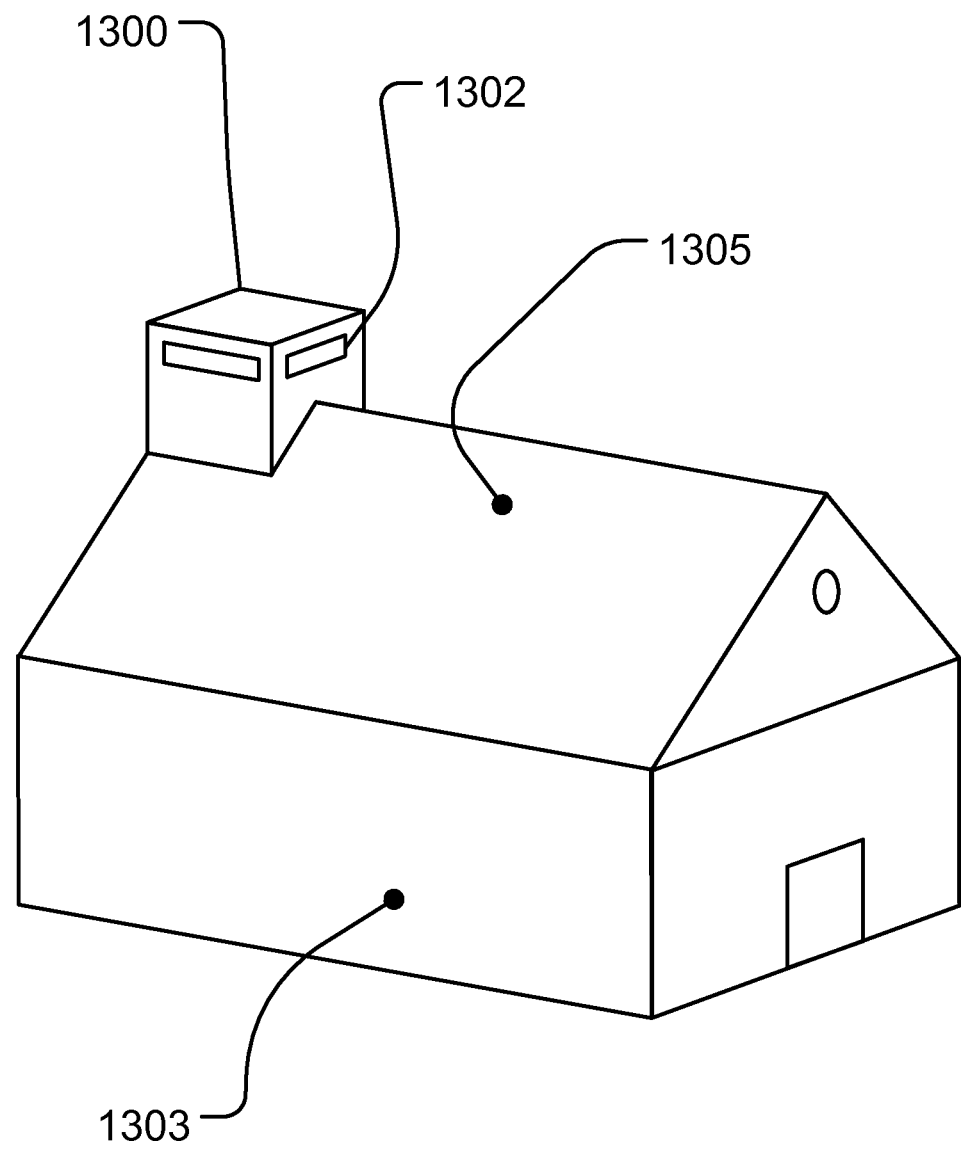
FIG. 13 shows the installation of the system on a building, as an example.

The structures above can be installed at the attic of a small house, e.g. as in FIG. 13, with the hollow tower shaft going on the side or inside of a small building, toward the basement, with a tray or collector, collecting water/rain and passing toward basement, and eventually letting the water around the foundation of the house, outside in the yard, or in the water well. The system can be extended from the roof of the building on the top. The system can be modularized for customization and easy installation on spot/shipping from factory, for flexibility, for more customers. The components for FIG. 13 are, as an example:
- 1300: one or more wind towers at middle of or periphery of or integrated with a building (1303), with air flow inlets (e.g., 1302).
- The roof (1305) may be inclined. The cosmetics/decorations may be used to make the wind tower look like a terrace, room, or a chimney.

The position of the blades/rotor can be higher/on top of the generator, in one embodiment. Alternatively, in one embodiment, the position of the blades/rotor can be lower/at the bottom of the generator.

The structure can be attached to a building or inside a building, or can be stand-alone, with its own foundation, legs, or moving parts/devices, such as 4 wheels under its 4 legs, as an example, to be able to move around and gets installed elsewhere, in a moment's notice, or changes its position or direction that it faces during the day/season, to optimize its position/location. The stand-alone structure can be separate from a building, in one example. The stand-alone structure is on top of a building, in one example, with 4 legs or more, tied up/locked/secured/bolted down or loose on the roof, e.g. as in FIG. 14. The components for FIG. 14 are, as an example:
- 1400: one or more wind towers installed (1410) on rooftop (1405) of a building (1403),
- with air flow inlets (e.g., 1402).
- The well/channel (1404) is situated on the rooftop, in one embodiment.

Figure 14:
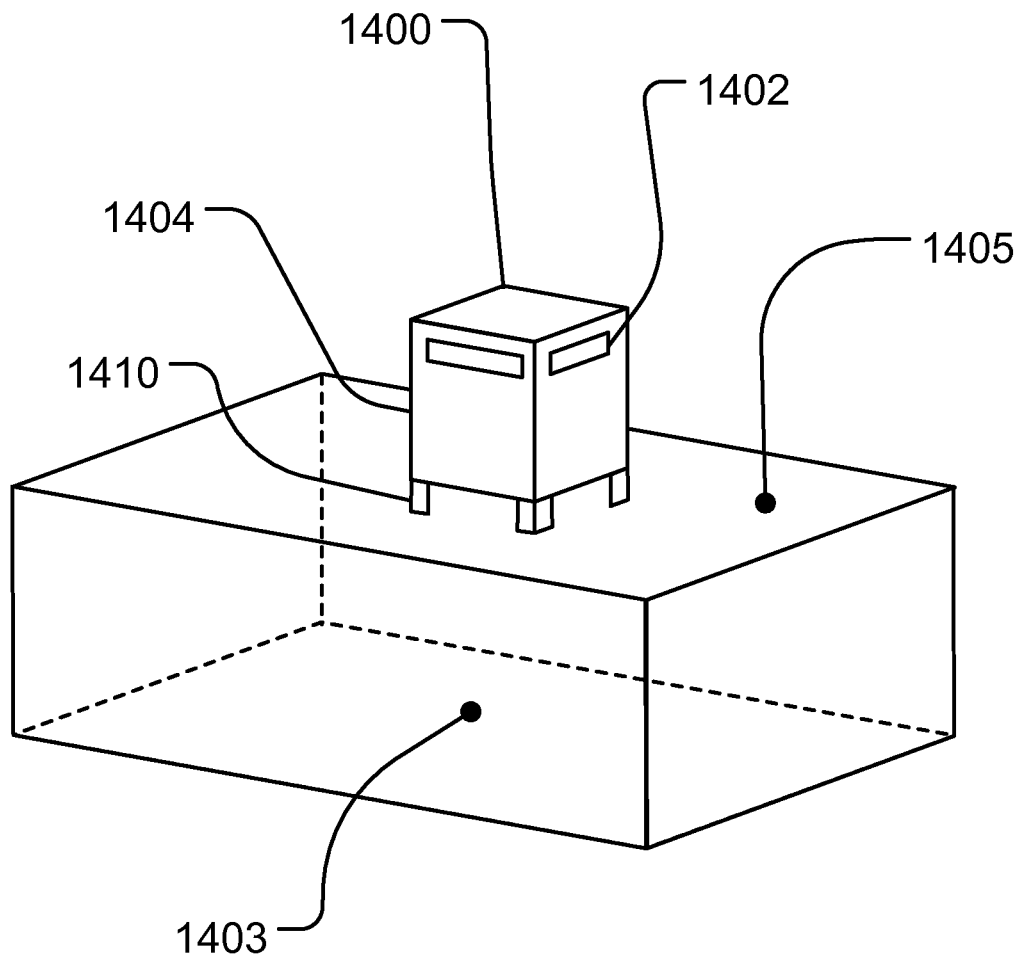
FIG. 14 shows the installation of the system on/over a building, as an example.
Figure 15:
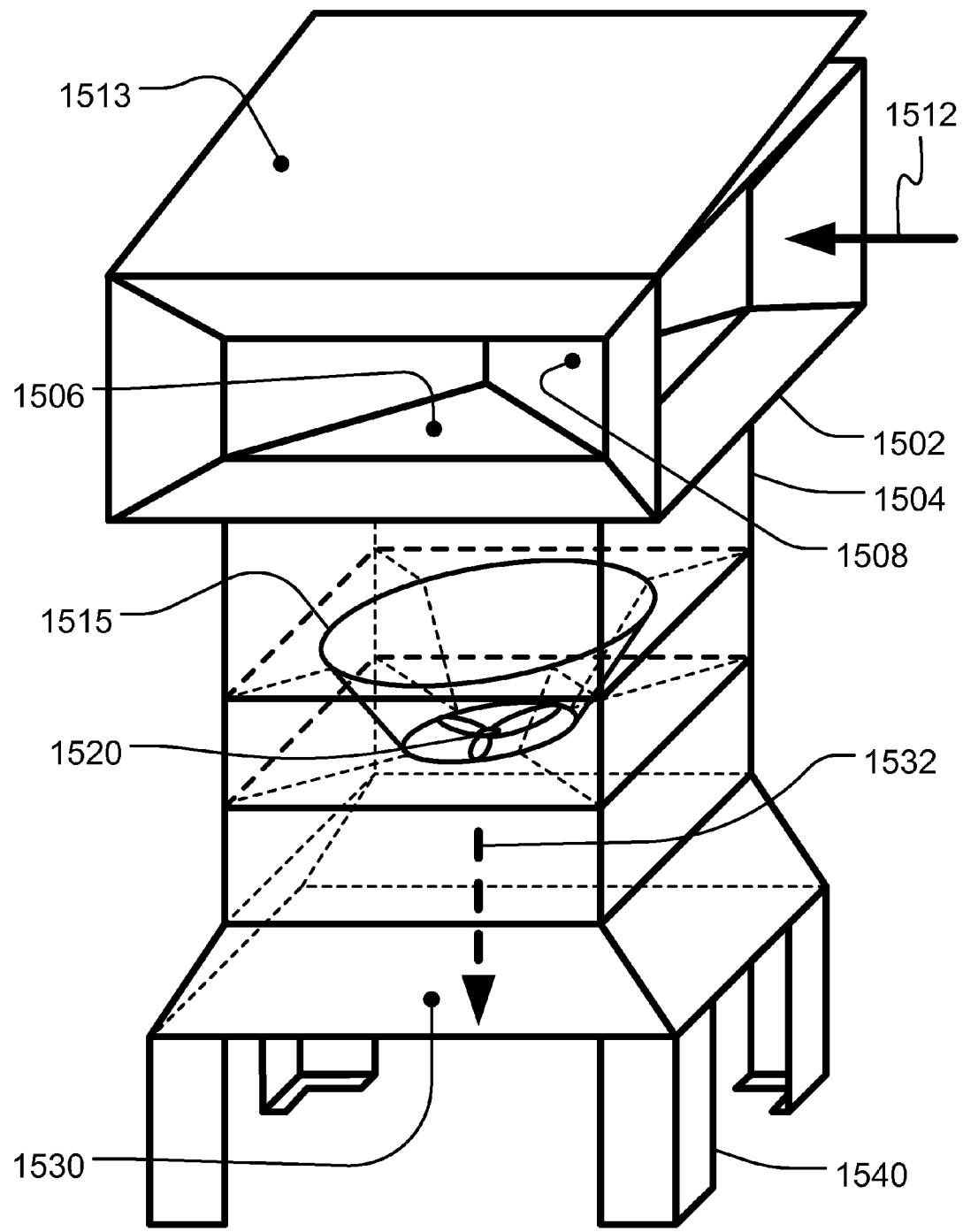
FIG. 15 shows a stand alone unit, as an example.

FIG. 15 is an example of FIG. 14, with a diffuser inside the well, with multiple legs. The components for FIG. 15 are, as an example:
- 1502: Inlet
- 1512: Air flow to inlet
- 1513: solar panel
- 1506: opening
- 1508: divider
- 1504: neck of the assembly
- 1515: diffuser inside channel/well
- 1520: turbine
- 1532: air flow passed turbine, exiting at outlet
- 1530: exit or outlet
- 1540: assembly support Multiple rotors or set of blades can be placed in series (vertically) or in parallel (horizontally), which can be separated using diffusers in between. In one embodiment, we have a wind turbine for generating electricity from wind, fluid, or air power, which comprises an array of shafts, an array of blades, and an array of diffuser surround structure. This internal structure or setup was described fully at our earlier U.S. application Ser. No. 12/455,042, which is incorporated here by reference, with all its teaching included. Note that the array of shafts are connected to said array of blades, and the array of diffuser surround structure is located in between the array of blades, to direct air or fluid going toward the array of blades. In one embodiment, the blades of different sizes can be used. In one embodiment, the blades can face different directions. In one embodiment, the wind turbine comprises one or more gearboxes. In one embodiment, the wind turbine comprises blades nested in a straight line series. In one embodiment, the wind turbine comprises blades nested in a curved line series. In one embodiment, the wind turbine comprises blades clustered in a 3-dimensional structure. In one embodiment, the wind turbine is attached to a boat, train, moveable object or vehicle, car, air floating or moving device, or space craft on another planet. In one embodiment, each member of the array of diffuser surround structure is circular (in cross section) or cylindrically-shaped.

An example of the size for wind-catcher tower is 12 ft×12 ft×27 ft, with diffuser at 12 ft diameter, and Inlet at 6 ft diameter, with turbine area with 30 degree wall slope, for this example. Note the diffuser's area with respect to the tower well's cross-section area. (See e.g. the paper mentioned above, Gerard Van Bussel, 2007 IOP Publishing Ltd, with the result about the ratio of the areas, corresponding to rotor power coefficient values, corresponding to the efficiency and improvement of the turbine.)

Figure 11:
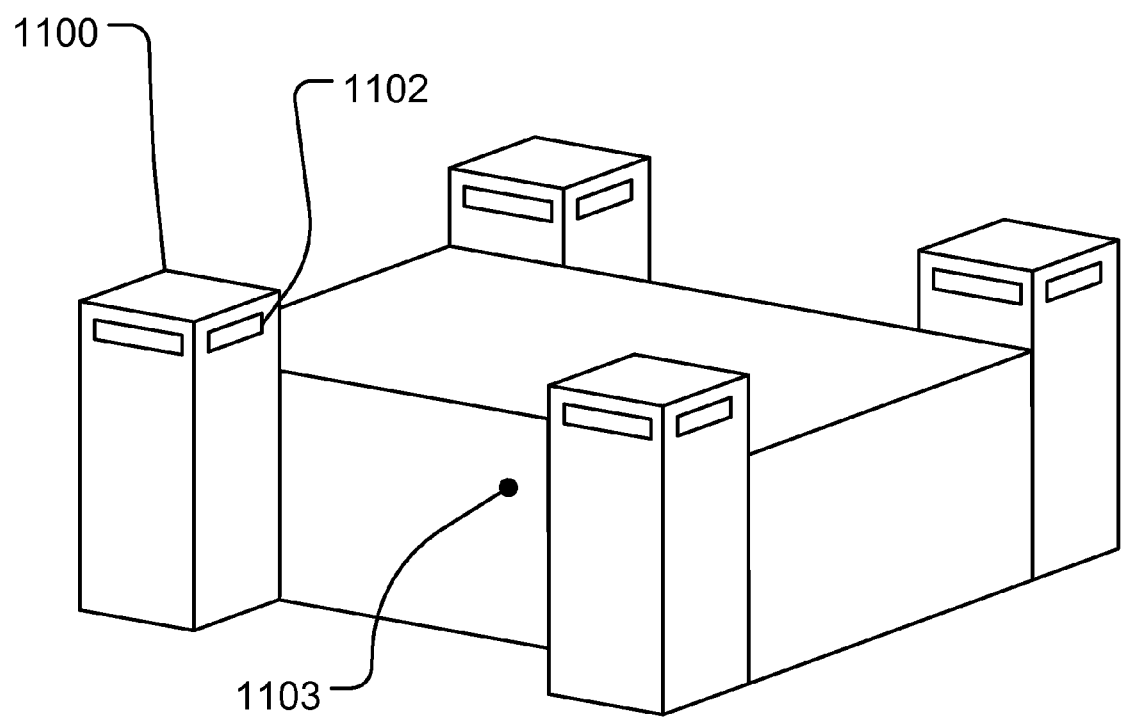
FIG. 11 shows the installation of the system on a building, as an example.

FIG. 11 shows the 4 units/systems/towers installed on 4 sides of a building. The components for FIG. 11 are, as an example:

1100: one or more wind towers at or near the periphery of a building (1103), with air flow inlets (e.g., 1102).

Figure 12:
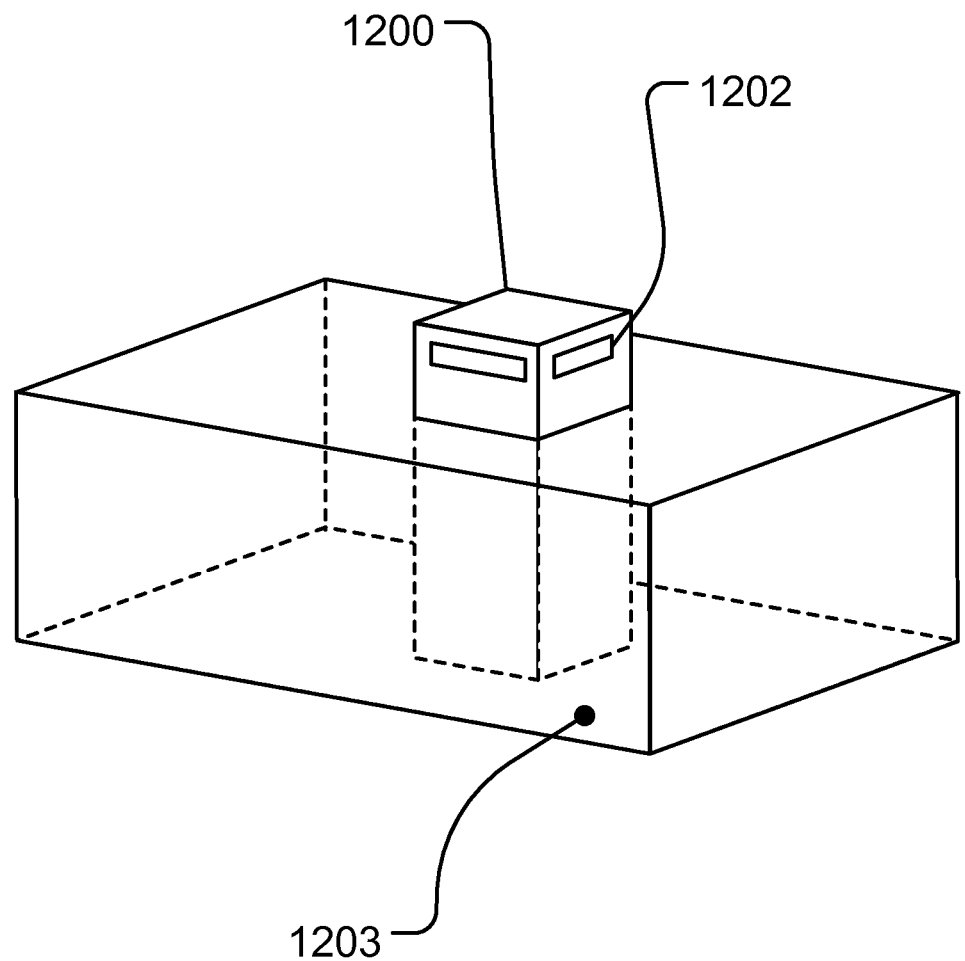
FIG. 12 shows the installation of the system on a building, as an example.

FIG. 12 shows the 1 unit/system/tower installed in the middle of a building. The components for FIG. 12 are, as an example:

1200: one or more wind towers at middle of or integrated with a building (1203), with air flow inlets (e.g., 1202). Wind tower may incorporate an elevator shaft in the building.

Figure 17A:
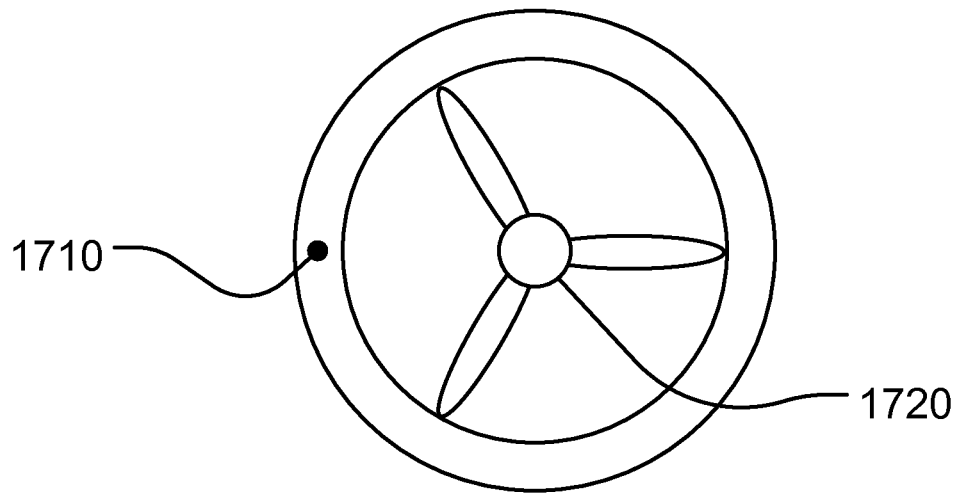
FIG. 17a shows the rotor with diffuser around it, front view, as an example.
Figure 17B:
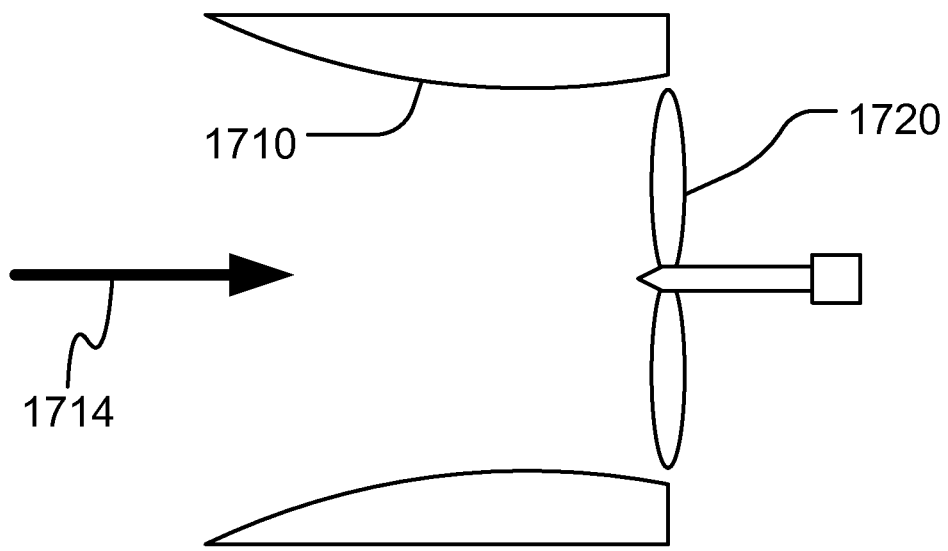
FIG. 17b shows the rotor with diffuser around it, side view, as an example.

FIGS. 17a-b show the front and side views of the turbine or rotor with side diffusers, directing the air toward the turbine. The components for FIG. 17 are, as an example:

1710: Diffuser
1714; Air flow
1720: Turbine (e.g., small wind turbine)

Figure 18:
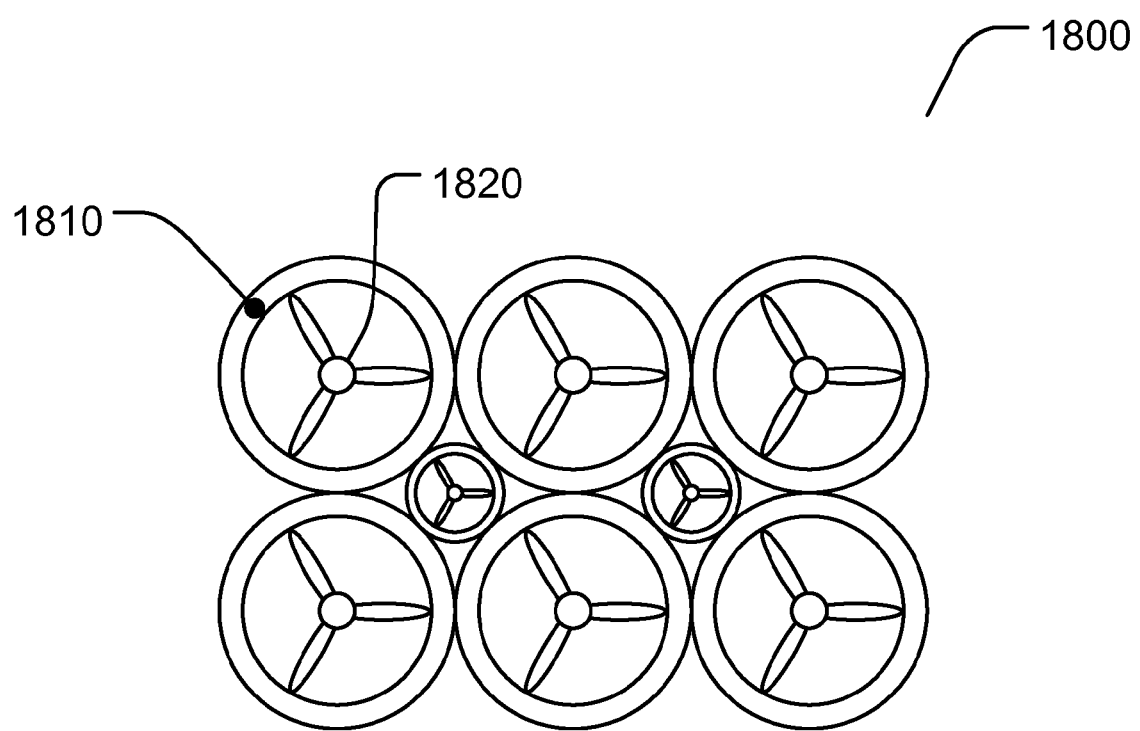
FIG. 18 shows the array of the rotors, with diffusers around them, in-between, front view, as an example.

FIG. 18 shows an array or matrix of 2-dimensional (2D) or 3D stack or rows of turbines or rotors, with one or more sizes, in parallel or staggered, in one or more rows, ordered or not-ordered, e.g. with the smaller ones in between the bigger turbines or rotors (e.g. as in FIG. 18), to cover more area, separated by diffusers in-between. They can be on separate generators. Or, alternatively, all or some are hooked on the back (cascaded), on one or more generators, using gears, gearboxes, or chains, to connect the axis together, collectively, to add power of the rotors together, merged/summed up on a same generator. The components for FIG. 18 are, as an example:

1800: cluster of wind turbines
1810: Diffuser(s)
1820: Turbine (e.g., small wind turbine)

Figure 19:
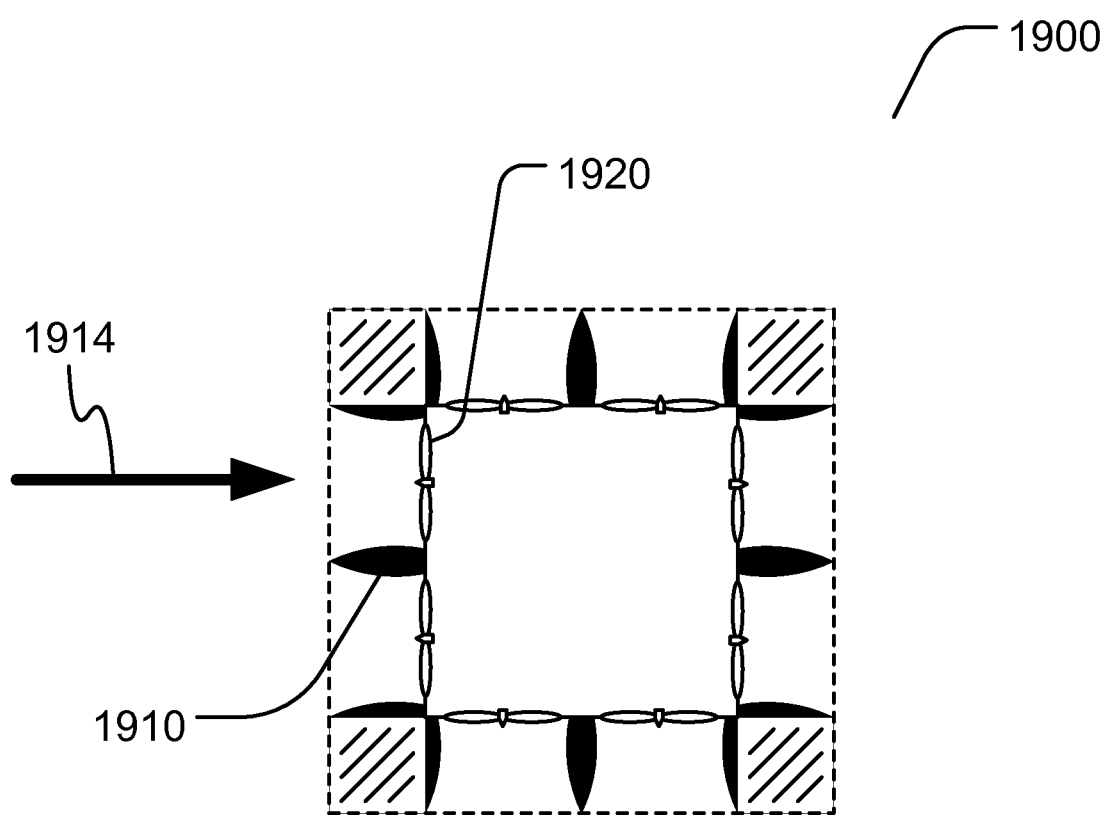
FIG. 19 shows the array of the rotors, with diffusers around them, in-between, top view, cross sectional view, in 2D, as a square, in 4 directions/sides, for inlets, and optional rotors, as an example.

Another example of an array/matrix of rotors shown in FIG. 18 is shown in FIG. 19, in cross section, on a rectangle/square shape, with inlets from all 4 sides, optionally with 2 rotors or columns of rotors shown on each side, as an example, with rotors separated by diffusers in-between, to cover wind from multiple directions. This is the top view of the structure. The components for FIG. 19 are, as an example:

1900: cluster of wind turbines
1910: Diffuser
1920: Turbine (e.g., small wind turbine)
1940: Air flow Any variations of the teachings above are also meant to be protected by the disclosure here.

The invention claimed is:

1. A system for generating electricity from wind power, said system comprising:
   a well structure;
   an inlet cap structure;
   a wind turbine or a rotor;
   said well structure comprises one or more outlets;
   said inlet cap structure comprises two or more inlets;
   each of said two or more inlets comprises at least one diffuser; and
   each of said at least one diffuser concentrates air toward said well structure, through each of said two or more inlets;
   wherein said at least one diffuser narrows down in cross section toward said well structure;
   wherein said at least one diffuser ends up with multiple vertical separators and one horizontal cap separator on top of said well structure;
   wherein said multiple vertical separators and said one horizontal cap separator redirect air coming through each of said two or more inlets, and going through a horizontal opening, downward, toward bottom of said well structure;
   wherein said horizontal opening is only exit route for air coming in, through each of said two or more inlets.

2. The system for generating electricity from wind power as recited in claim 1, wherein cross section of said inlet cap structure is square, rectangle, circle, or oval shaped.

3. The system for generating electricity from wind power as recited in claim 1, wherein cross section of said well structure is square, rectangle, circle, or oval shaped.

4. The system for generating electricity from wind power as recited in claim 1, wherein said inlet cap structure comprises one or more doors, shutters, caps, plates, covers, coverings, adjustable openings, louvers, registers, adjustable channels, or valves.

5. The system for generating electricity from wind power as recited in claim 1, wherein said inlet cap structure comprises one or more motors, rails, tracks, actuators, cables, belts, pivots, pulleys, chains, rods, springs, limiters, delimiters, gears, or gearboxes.

6. The system for generating electricity from wind power as recited in claim 1, wherein a controller or processor controls amount of air intake through said two or more inlets.

7. The system for generating electricity from wind power as recited in claim 1, wherein a controller or processor controls amount of air intake into said well structure, using one or more doors, shutters, caps, plates, covers, coverings, adjustable openings, louvers, registers, adjustable channels, or valves.

8. The system for generating electricity from wind power as recited in claim 1, wherein a motor rotates top of said inlet cap structure.

9. The system for generating electricity from wind power as recited in claim 1, wherein a motor tilts top of said inlet cap structure.

10. The system for generating electricity from wind power as recited in claim 1, wherein said well structure houses more than one wind turbines or rotors.

11. The system for generating electricity from wind power as recited in claim 10, wherein said more than one wind turbines or rotors have a common rotational axis or shaft.

12. The system for generating electricity from wind power as recited in claim 10, wherein said more than one wind turbines or rotors have different rotational axes or shafts.

13. The system for generating electricity from wind power as recited in claim 10, wherein said more than one wind turbines or rotors are connected through gears or gearboxes.

14. The system for generating electricity from wind power as recited in claim 1, wherein said well structure comprises one or more diffusers.

15. The system for generating electricity from wind power as recited in claim 1, wherein said well structure is at, or close to, or is in combination with, one or more elevators' shafts, wells, or hollow structures.

16. The system for generating electricity from wind power as recited in claim 1, wherein said system comprises coil, magnet, or generator, which is located at perimeter of cross section of said well structure.

17. The system for generating electricity from wind power as recited in claim 1, wherein said system comprises coil and magnet of a turbine or a generator, wherein said coil and magnet are located at perimeter of a circle.

18. The system for generating electricity from wind power as recited in claim 1, wherein said system comprises a vertical turbine.

* * * * *